US012774946B2

(12) United States Patent
Tahara

(10) Patent No.: US 12,774,946 B2
(45) Date of Patent: Oct. 27, 2026

(54) BIOLOGICAL SAMPLE ANALYSIS SYSTEM, METHOD FOR SETTING LIGHT DATA ACQUISITION SECTION IN BIOLOGICAL SAMPLE ANALYSIS SYSTEM, AND INFORMATION PROCESSING DEVICE

(71) Applicant: Sony Group Corporation, Tokyo (JP)

(72) Inventor: Katsutoshi Tahara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 220 days.

(21) Appl. No.: 18/730,001

(22) PCT Filed: Jan. 18, 2023

(86) PCT No.: PCT/JP2023/001254
§ 371 (c)(1),
(2) Date: Feb. 18, 2025

(87) PCT Pub. No.: WO2023/145551
PCT Pub. Date: Aug. 3, 2023

(65) Prior Publication Data

US 2025/0180461 A1 Jun. 5, 2025

(30) Foreign Application Priority Data

Jan. 31, 2022 (JP) ................................ 2022-013136

(51) Int. Cl.
*G01N 15/149* (2024.01)
*G01N 15/1429* (2024.01)

(52) U.S. Cl.
CPC ....... *G01N 15/1431* (2013.01); *G01N 15/149* (2024.01)

(58) Field of Classification Search
CPC ......................... G01N 15/1431; G01N 15/149
See application file for complete search history.

(56) References Cited

U.S. PATENT DOCUMENTS

2011/0303859 A1 12/2011 Lofstrom et al.
2015/0253235 A1* 9/2015 Kaduchak .......... G01N 15/1012 702/89
2018/0090906 A1 3/2018 Couderc et al.

FOREIGN PATENT DOCUMENTS

EP 4 024 027 A1 7/2022
JP 2013-522601 A 6/2013
(Continued)

OTHER PUBLICATIONS

International Search Report and English translation thereof mailed Feb. 21, 2023 in connection with International Application No. PCT/JP2023/001254.

*Primary Examiner* — Jamil Ahmed
(74) *Attorney, Agent, or Firm* — Wolf, Greenfield & Sacks, P.C.

(57) ABSTRACT

An object of the present disclosure is to provide a technology for appropriately setting a timing of acquiring data related to light generated from biological particles.
The present disclosure provides a biological sample analysis system including: a light irradiation unit designed to irradiate each particle flowing through a flow channel with light at a plurality of irradiation points; a detection unit that detects light generated when each of the particles passes through each of the plurality of irradiation points; and an information processing unit that processes data related to light detected by the detection unit, in which the information processing unit is designed to perform processing of setting a section that defines a time for acquiring data related to light generated by light irradiation at an irradiation point different from a reference irradiation point, and the information processing unit executes the section setting processing on the basis of a change in data related to light accompanying a change in the section.

17 Claims, 11 Drawing Sheets

(56) References Cited

FOREIGN PATENT DOCUMENTS

| | | | |
|---|---|---|---|
| JP | 2014-202573 | A | 10/2014 |
| JP | 2017-511884 | A | 4/2017 |
| JP | 2018-515907 | A | 6/2018 |
| WO | 2021/090573 | A1 | 5/2021 |

* cited by examiner

BIOLOGICAL SAMPLE ANALYSIS SYSTEM, METHOD FOR SETTING LIGHT DATA ACQUISITION SECTION IN BIOLOGICAL SAMPLE ANALYSIS SYSTEM, AND INFORMATION PROCESSING DEVICE

CROSS REFERENCE TO RELATED APPLICATIONS

This is a U.S. National Stage Application under 35 U.S.C. § 371, based on International Application No. PCT/JP2023/001254, filed Jan. 18, 2023, which claims priority to Japanese Patent Application JP 2022-013136, filed Jan. 31, 2022, each of which is hereby incorporated by reference in its entirety.

TECHNICAL FIELD

The present disclosure relates to a biological sample analysis system, a method for setting a light data acquisition section in a biological sample analysis system, and an information processing device.

BACKGROUND ART

For example, a particle population such as cells, microorganisms, and liposomes is labeled with a fluorescent dye, and the intensity and/or pattern of fluorescence generated from the fluorescent dye excited by irradiating each particle of the particle population with laser light is measured, thereby measuring the characteristics of the particles. A flow cytometer is a representative example of the biological sample analyzer that performs the measurement. In addition, as another example of the biological sample analyzer, a device for sorting particles in a closed space has also been proposed.

In such a biological sample analyzer, particles to be analyzed contained in a sample flow in a flow channel in a line. Therefore, in order to sort the particles, a technology of identifying the time to reach the position to be sorted has been proposed. For example, Patent Document 1 below discloses a particle sorting apparatus including an excitation light irradiation unit that irradiates a particle flowing through a flow channel with excitation light, a speed detection light irradiation unit that irradiates the particle with speed detection light at a position different from the excitation light, a light detection unit that detects light emitted from the particle, an arrival time calculation unit that individually calculates a time for each particle to arrive at a sorting unit that communicates with the flow channel from a detection time difference between light derived from the excitation light and light derived from the speed detection light, and a sorting control unit that controls sorting of the particle, in which the flow channel and the sorting unit are provided in a microchip, and the sorting control unit determines whether or not to collect the particles on the basis of data of each particle detected by the light detection unit and the arrival time calculated by the arrival time calculation unit.

CITATION LIST

Patent Document

Patent Document 1: Japanese Patent Application Laid-Open No. 2014-202573

SUMMARY OF THE INVENTION

Problems to be Solved by the Invention

The timing of sorting the biological particles can be appropriately set by the technology disclosed in Patent Document 1. Regarding a biological particle analyzer for analyzing biological particles flowing in a flow channel, it is also required to appropriately set not only the sorting timing but also the timing of acquiring data related to light generated from the biological particles.

An object of the present disclosure is to provide a technology for appropriately setting a timing of acquiring data related to light generated from biological particles.

Solutions to Problems

The present disclosure provides a biological sample analysis system including:

- a light irradiation unit designed to irradiate each particle flowing through a flow channel with light at a plurality of irradiation points;
- a detection unit that detects light generated when each of the particles passes through each of the plurality of irradiation points; and
- an information processing unit that processes data related to light detected by the detection unit, in which
- the information processing unit is designed to perform processing of setting a section that defines a time for acquiring data related to light generated by light irradiation at one or more irradiation points different from a reference irradiation point, and
- the information processing unit executes the section setting processing on the basis of a change in data related to light accompanying a change in the section.

The information processing unit may be designed to execute the section setting processing on the basis of an approximate expression representing a change in data related to light accompanying a change in the section.

The change in the data related to light may be a change in a dispersion index value related to area data or height data of detected light.

The information processing unit may be designed to set the section on the basis of an approximate expression representing a change in the dispersion index value.

The change in the section may be a change in which the section is delayed stepwise from a time point at which each of the particles passes through the reference irradiation point, or a change in which the section is brought closer stepwise to a time point at which each of the particles passes through the reference irradiation point.

The information processing unit may acquire data related to light for each of the changed sections.

The information processing unit may use a data set including each section and data related to light corresponding to each section to generate an approximate expression representing a change in data related to light accompanying a change in the section.

The information processing unit may select data used to create the approximate expression on the basis of a data representative value of area data or height data of detected light and/or a dispersion index value of height data or area data of detected light.

The information processing unit may generate the approximate expression using data in which a data representative value of area data or height data of detected light satisfies a predetermined first condition and a dispersion index value of height data or area data of detected light satisfies a predetermined second condition.

The detection unit may include two or more photodetectors that detect light generated by light irradiation at one irradiation point, and the information processing unit may be designed to create the approximate expression for each of the two or more photodetectors. The information processing unit may set the section for each of the two or more photodetectors on the basis of the approximate expression created for each of the photodetectors, or set the section commonly applied to the two or more photodetectors on the basis of the approximate expression created for each of the two or more photodetectors.

In a case where a bead group including two or more kinds of calibration beads is used in the section setting processing, the biological sample analysis system may execute processing of acquiring data related to light of one kind of calibration bead of the bead group.

The biological sample analysis system may acquire data related to light of the one kind of calibration bead based on scattered light data.

The biological sample analysis system may be designed to sort biological particles.

The biological sample analysis system may be designed such that the particle sorting is performed in a closed space.

Furthermore, the present disclosure also provides a method for setting a light data acquisition section in a biological sample analysis system including: a light irradiation unit designed to irradiate each particle flowing through a flow channel with light at a plurality of irradiation points; a detection unit that detects light generated when each of the particles passes through each of the plurality of irradiation points; and an information processing unit that processes data related to light detected by the detection unit, the method including performing processing of setting a section that defines a time for acquiring data related to light generated by light irradiation at one or more irradiation points different from a reference irradiation point, in which the section setting processing is performed on the basis of a change in data related to light accompanying a change in the section. Furthermore, the present disclosure also provides an information processing device in which data related to light detected by a detection unit of a biological sample analysis system including a light irradiation unit designed to irradiate each particle flowing through a flow channel with light at a plurality of irradiation points, and the detection unit that detects light generated when each of the particles passes through each of the plurality of irradiation points is processed, and processing of setting a section that defines a time for acquiring data related to light generated by light irradiation at an irradiation point different from a reference irradiation point is executed on the basis of a change in data related to light accompanying a change in the section.

MODE FOR CARRYING OUT THE INVENTION

Hereinafter, preferred modes for carrying out the present disclosure will be described. Note that embodiments described below illustrate representative embodiments of the present disclosure, and the scope of the present disclosure is not limited only to these embodiments. Note that the present disclosure will be described in the following order.

1. First embodiment (biological sample analysis system)
(1) Description of present disclosure
(2) Configuration example of device
(3) Configuration example of chip
(4) Setting processing
2. Second embodiment (method for setting light data acquisition section in biological sample analysis system)
3. Third embodiment (information processing device)

1. First Embodiment (Biological Sample Analysis System)

(1) Description of Present Disclosure

Figure 5:
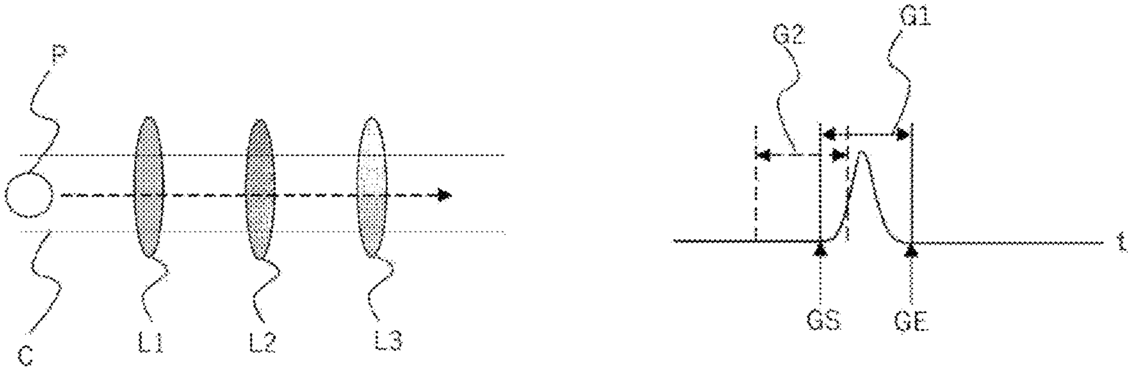
FIG. 5 is a diagram illustrating a schematic example of arrangement of light irradiation points in a biological sample analyzer designed to irradiate particles flowing through a flow channel with light at a plurality of irradiation points.

There is a biological sample analyzer designed to irradiate particles flowing through a flow channel with light at a plurality of irradiation points. The device has, for example, two or more laser light irradiation points on different axes. A schematic example of the arrangement of light irradiation points in such a device is illustrated in FIG. 5. As illustrated on the left side of the drawing, there are three light irradiation points L1, L2, and L3 having different axes on a flow channel C. When particles P flowing through the flow channel passes through each irradiation point, light is generated by irradiating the particle with laser light. The timings of passing through the irradiation points are different. Therefore, the timings at which light is generated by laser light irradiation at the light irradiation points are also different. It is required to acquire data related to light generated at the time of passing through each irradiation point at an appropriate timing.

A schematic example of pulse data of light detected by a light receiving system of the device is illustrated on the right side of the drawing. This example is a graph plotting light intensity against time. The section on the time axis where data is acquired is required to be set so as to cover a pulse portion (portion with high light intensity) in the graph. For example, a section G1 in the drawing is appropriate as the section for acquiring data, but a section G2 is not appropriate.

Note that in the present specification, the section is also referred to as "time gate" or "light data acquisition section (on the time axis)".

As illustrated in the drawing, the time gate has a start point GS and an end point GE. The time gates set for the light irradiation points L2 and L3 are set later than the time gate set for the light irradiation point L1. That is, the start point of the time gate of each of the light irradiation points L2 and L3 is a time point delayed from the start point of the time gate of the light irradiation point L1. In the present specification, a time gate start point set later than a start point of a certain time gate is also referred to as a delay time (laser delay time or LDT).

As described above, regarding the biological sample analyzer having a plurality of light irradiation points, it is required to appropriately set the time gate for each irradiation point. In order to appropriately set the time gate, it is desirable to appropriately set the start point of the time gate. In addition, regarding the biological sample analyzer having a plurality of light irradiation points as described above, since the timing at which light is generated by laser light irradiation at each light irradiation point is different, it is required to set an appropriate time gate start point for each irradiation point.

In order to appropriately set the time gate, for example, it is conceivable to set the time gate on the basis of the waveform of the pulse data described above. However, the amount of data for obtaining a waveform is extremely large. In addition, the time gate setting based on a waveform may take time. It is also conceivable to reduce the number of sample particles in order to reduce the time for the time gate setting, but this could lead to a reduction in statistical accuracy.

In addition, setting of the time gate is performed before analysis of the biological sample, such as in a calibration step. In such a step, beads are often used. As the bead used in such a step, a single bead may be used or a mixture of a plurality of kinds of beads may be used. In addition, the ratio of doublet or more (in addition to doublet, triplet, and quartet, for example) may increase. In a case where two or more kinds of beads are included in the sample used for the time gate setting or in a case where the ratio of doublet or more is large, it may take time to obtain an appropriate waveform, and the algorithm for the time gate setting based on the waveform may be complicated.

In accordance with the present disclosure, a section that defines a time for acquiring data related to light generated by light irradiation at an irradiation point different from a reference irradiation point is set, and the setting processing of the section is executed on the basis of a change in data related to light accompanying a change in the section. As a result, an appropriate time gate can be efficiently set. Moreover, the amount of data required for setting the time gate can be significantly reduced.

That is, the present disclosure relates to a biological sample analysis system including: a light irradiation unit designed to irradiate each particle flowing through a flow channel with light at a plurality of irradiation points; a detection unit that detects light generated when each particle passes through each of the plurality of irradiation points; and an information processing unit that processes data related to light detected by the detection unit. Here, the information processing unit may be designed to perform processing of setting a section that defines a time for acquiring data related to light generated by light irradiation at one or more irradiation points other than the reference irradiation point. The information processing unit may execute the section setting processing on the basis of a change in data related to light accompanying a change in the section.

Figure 1:
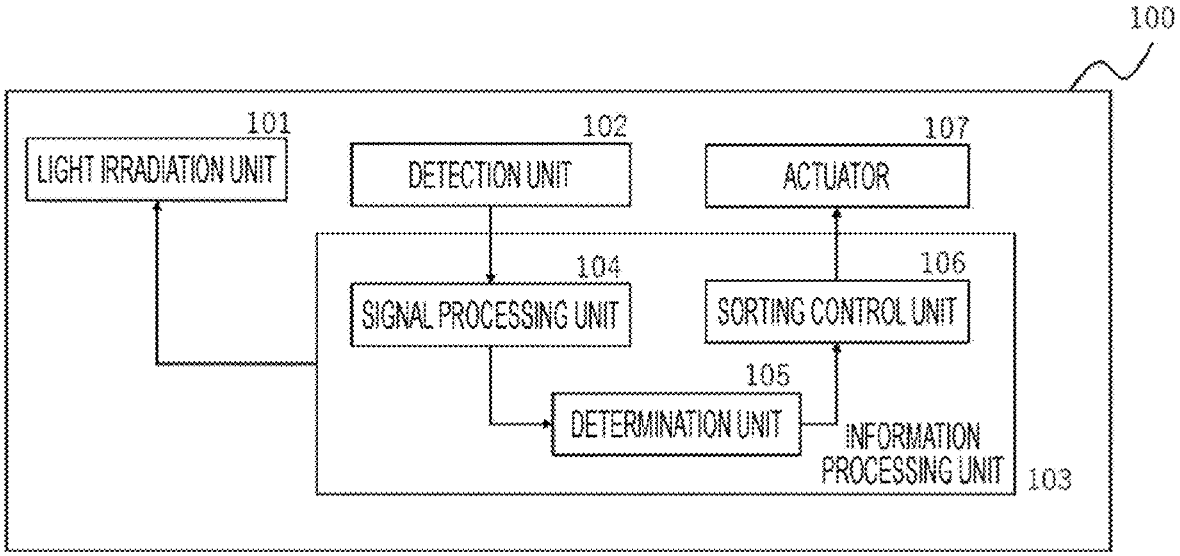
FIG. 1 is a block diagram illustrating a configuration example of a biological sample analysis system of the present disclosure.

A configuration example of the biological sample analysis system is illustrated in FIG. 1. As illustrated in the drawing, a biological sample analysis system 100 may include the light irradiation unit 101, the detection unit 102, and the information processing unit 103. These components (light detection unit, detection unit, and information processing unit) may be distributed to a plurality of devices, or may be included in one device. For example, the biological sample analysis system may include a device including the light detection unit and the detection unit, and a device (for example, information processing device) including the information processing unit. Alternatively, the biological sample analysis system may be designed as one device (biological sample analyzer) including the light detection unit, the detection unit, and the information processing unit.

In addition, the present disclosure also relates to a method for setting a light data acquisition section in the biological sample analysis system. The setting method may include executing, in the biological sample analyzer, processing of setting a section that defines a time for acquiring data related to light generated by light irradiation at one or more irradiation points other than the reference irradiation point. The section setting processing may be executed on the basis of a change in data related to light accompanying a change in the section.

Furthermore, the present disclosure also provides an information processing device designed to execute the setting processing.

In one embodiment, the information processing unit may execute the section setting processing on the basis of an approximate expression representing a change in data related to light accompanying a change in the section. By using the approximate expression, the section setting processing can be appropriately executed. The approximate expression may be, for example, an n-th order approximation (n is, for example, any integer of one to four, and particularly two).

The data related to light may be, for example, area data, height data, or both. For example, the change in the data related to light may be a change in the dispersion index value regarding the area data or the height data of the detected light.

When the time gate deviates from the pulse, for example, the dispersion index value (for example, rCV, robust coefficient of variation) of the area data and the height data deteriorates. Hence, an appropriate time gate can be set on the basis of a change in the area data or the height data.

In addition, if the time gate completely deviates from the pulse, there is a case where deterioration of rCV cannot be detected. However, in this case, since the height value or the area value becomes small, the case can be handled by referring to the height data or the area data.

Hereinafter, first, a configuration example of the biological sample analysis system according to the present disclosure and a configuration example of a chip used for particle sorting will be described. That is, the biological sample analysis system according to the present disclosure may be designed, for example, as described in the following (2), that is, may include a light irradiation unit, a detection unit, an information processing unit, and optionally a sorting unit. In addition, the biological sample analysis system according to the present disclosure may be designed to execute sorting processing of biological particles using, for example, a chip described in the following (3). In the following (4), section setting processing executed by the biological sample analysis system (in particular, information processing unit) will be described.

(2) Configuration Example of Device

Figure 2:
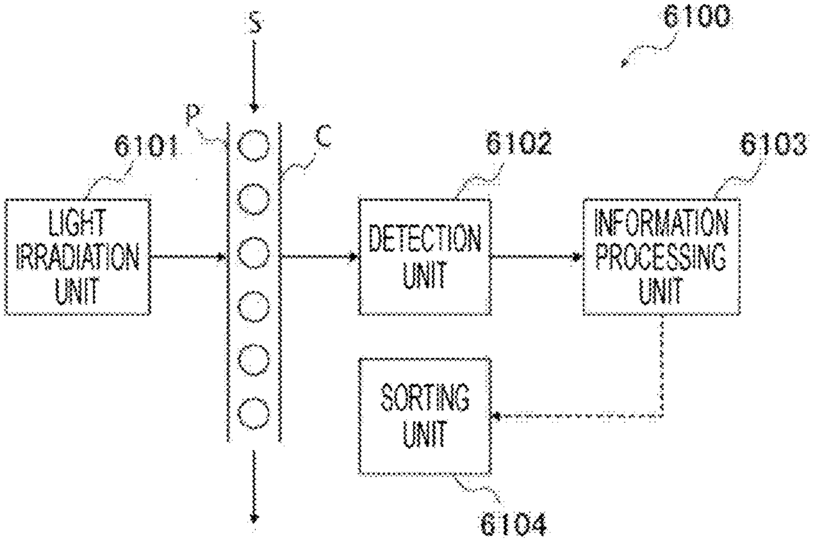
FIG. 2 is a diagram illustrating a configuration example of the biological sample analysis system of the present disclosure.

FIG. 2 illustrates a configuration example of the biological sample analyzer of the present disclosure. A biological sample analyzer 6100 illustrated in the drawing includes: a light irradiation unit 6101 that irradiates a biological sample S flowing in the flow channel C with light; a detection unit 6102 that detects light generated by irradiating the biological sample S with light; and an information processing unit 6103 that processes information regarding light detected by the detection unit. The biological sample analyzer 6100 is a flow cytometer or an imaging cytometer, for example. The biological sample analyzer 6100 may include a sorting unit 6104 that sorts out specific biological particles P in a biological sample. The biological sample analyzer 6100 including the sorting unit is a cell sorter, for example.

(Biological Sample)

The biological sample S may be a liquid sample containing biological particles. The biological particles are cells or non-cellular biological particles, for example. The cells may be living cells, and more specific examples thereof include blood cells such as erythrocytes and leukocytes, and germ cells such as sperms and fertilized eggs. Also, the cells may be those directly collected from a sample such as whole blood, or may be cultured cells obtained after culturing. The non-cellular biological particles are extracellular vesicles, or particularly, exosomes and microvesicles, for example. The biological particles may be labeled with one or more labeling substances (such as a dye (particularly, a fluorescent dye) and a fluorochrome-labeled antibody). Note that particles other than biological particles may be analyzed by the biological sample analyzer of the present disclosure, and beads or the like may be analyzed for calibration or the like.

(Flow Channel)

The flow channel C is designed so that a flow of the biological sample S is formed. In particular, the flow channel C may be designed so that a flow in which the biological particles contained in the biological sample are aligned substantially in one row is formed. The flow channel structure including the flow channel C may be designed so that a laminar flow is formed. In particular, the flow channel structure is designed so that a laminar flow in which the flow of the biological sample (a sample flow) is surrounded by the flow of a sheath liquid is formed. The design of the flow channel structure may be appropriately selected by a person skilled in the art, or a known one may be adopted. The flow channel C may be formed in a flow channel structure such as a microchip (a chip having a flow channel on the order of micrometers) or a flow cell. The width of the flow channel C is 1 mm or smaller, or particularly, may be not smaller than 10 μm and not greater than 1 mm. The flow channel C and the flow channel structure including the flow channel C may be made of a material such as plastic or glass.

The biological sample analyzer of the present disclosure is designed so that the biological sample flowing in the flow channel C, or particularly, the biological particles in the biological sample are irradiated with light from the light irradiation unit 6101. The biological sample analyzer of the present disclosure may be designed so that the irradiation point of light on the biological sample is located in the flow channel structure in which the flow channel C is formed, or may be designed so that the irradiation point is located outside the flow channel structure. An example of the former case may be a configuration in which the light is emitted onto the flow channel C in a microchip or a flow cell. In the latter case, the biological particles after exiting the flow channel structure (particularly the nozzle portion thereof) may be irradiated with the light, and an example thereof may be a jet-in-air type flow cytometer.

(Light Irradiation Unit)

The light irradiation unit 6101 includes a light source unit that emits light, and a light guide optical system that guides the light to the irradiation point. The light source unit includes one or more light sources. The type of the light source(s) is a laser light source or an LED, for example. The wavelength of light to be emitted from each light source may be any wavelength of ultraviolet light, visible light, and infrared light. The light guide optical system includes optical components such as beam splitters, mirrors, or optical fibers, for example. The light guide optical system may also include a lens group for condensing light, and includes an objective lens, for example. There may be one or more irradiation points at which the biological sample and light intersect. The light irradiation unit 6101 may be designed to collect light emitted onto one irradiation point from one light source or different light sources.

(Detection Unit)

The detection unit 6102 includes at least one photodetector that detects light generated by emitting light onto biological particles. The light to be detected may be fluorescence or scattered light (such as one or more of the following: forward scattered light, backscattered light, and side scattered light), for example. Each photodetector includes one or more light receiving elements, and has a light receiving element array, for example. Each photodetector may include one or more photomultiplier tubes (PMTs) and/or photodiodes such as APDs and MPPCs, as the light receiving elements. The photodetector includes a PMT array in which a plurality of PMTs is arranged in a one-dimensional direction, for example. The detection unit 6102 may also include an image sensor such as a CCD or a CMOS. With the image sensor, the detection unit 6102 can acquire an image (such as a bright-field image, a dark-field image, or a fluorescent image, for example) of biological particles.

The detection unit 6102 includes a detection optical system that causes light of a predetermined detection wavelength to reach the corresponding photodetector. The detection optical system includes a spectroscopic unit such as a prism or a diffraction grating, or a wavelength separation unit such as a dichroic mirror or an optical filter. The detection optical system is designed to disperse the light generated by light irradiation to biological particles, for example, and detect the dispersed light with a larger number of photodetectors than the number of fluorescent dyes with which the biological particles are labeled. A flow cytometer including such a detection optical system is called a spectral flow cytometer. Further, the detection optical system is designed to separate the light corresponding to the fluorescence wavelength band of a specific fluorescent dye from the light generated by the light irradiation to the biological particles, for example, and cause the corresponding photodetector to detect the separated light.

The detection unit 6102 may also include a signal processing unit that converts an electrical signal obtained by a photodetector into a digital signal. The signal processing unit may include an A/D converter as a device that performs the conversion. The digital signal obtained by the conversion performed by the signal processing unit can be transmitted to the information processing unit 6103. The digital signal can be handled as data related to light (hereinafter, also referred to as "light data") by the information processing unit 6103. The light data may be light data including fluorescence data, for example. More specifically, the light data may be data of light intensity, and the light intensity may be light intensity data of light including fluorescence (the light intensity data may include feature quantities such as area, height, and width).

(Information Processing Unit)

The information processing unit 6103 includes a processing unit that performs processing of various kinds of data (light data, for example), and a storage unit that stores various kinds of data, for example. In a case where the processing unit acquires the light data corresponding to a fluorescent dye from the detection unit 6102, the processing unit can perform fluorescence leakage correction (a compensation process) on the light intensity data. In the case of a spectral flow cytometer, the processing unit also performs a fluorescence separation process on the light data, and acquires the light intensity data corresponding to the fluorescent dye. The fluorescence separation process may be performed by an unmixing method disclosed in JP 2011-232259 A, for example. In a case where the detection unit 6102 includes an image sensor, the processing unit may acquire morphological information about the biological particles, on the basis of an image acquired by the image sensor. The storage unit may be designed to be capable of storing the acquired light data. The storage unit may be designed to be capable of further storing spectral reference data to be used in the unmixing process.

In a case where the biological sample analyzer 6100 includes the sorting unit 6104 described later, the information processing unit 6103 can determine whether to sort the biological particles, on the basis of the light data and/or the morphological information. The information processing unit 6103 then controls the sorting unit 6104 on the basis of the result of the determination, and the biological particles can be sorted by the sorting unit 6104.

The information processing unit 6103 may be designed to be capable of outputting various kinds of data (such as light data and images, for example). For example, the information processing unit 6103 can output various kinds of data (such as a two-dimensional plot or a spectrum plot, for example) generated on the basis of the light data. The information processing unit 6103 may also be designed to be capable of accepting inputs of various kinds of data, and accepts a gating process on a plot by a user, for example. The information processing unit 6103 may include an output unit (such as a display, for example) or an input unit (such as a keyboard, for example) for performing the output or the input.

The information processing unit 6103 may be designed as a general-purpose computer, and may be designed as an information processing device that includes a CPU, a RAM, and a ROM, for example. The information processing unit 6103 may be included in the housing in which the light irradiation unit 6101 and the detection unit 6102 are included, or may be located outside the housing. Further, the various processes or functions to be executed by the information processing unit 6103 may be realized by a server computer or a cloud connected via a network.

(Sorting Unit)

The sorting unit 6104 performs sorting of biological particles, in accordance with the result of determination performed by the information processing unit 6103. The sorting method may be a method by which droplets containing biological particles are generated by vibration, electric charges are applied to the droplets to be sorted, and the traveling direction of the droplets is controlled by an electrode. The sorting method may be a method for sorting by controlling the traveling direction of biological particles in the flow channel structure. The flow channel structure has a control mechanism based on pressure (injection or suction) or electric charge, for example. An example of the flow channel structure may be a chip (the chip disclosed in JP 2020-76736 A, for example) that has a flow channel structure in which the flow channel C branches into a recovery flow channel and a waste liquid flow channel on the downstream side, and specific biological particles are collected in the recovery flow channel.

(3) Configuration Example of Chip

Figure 3:
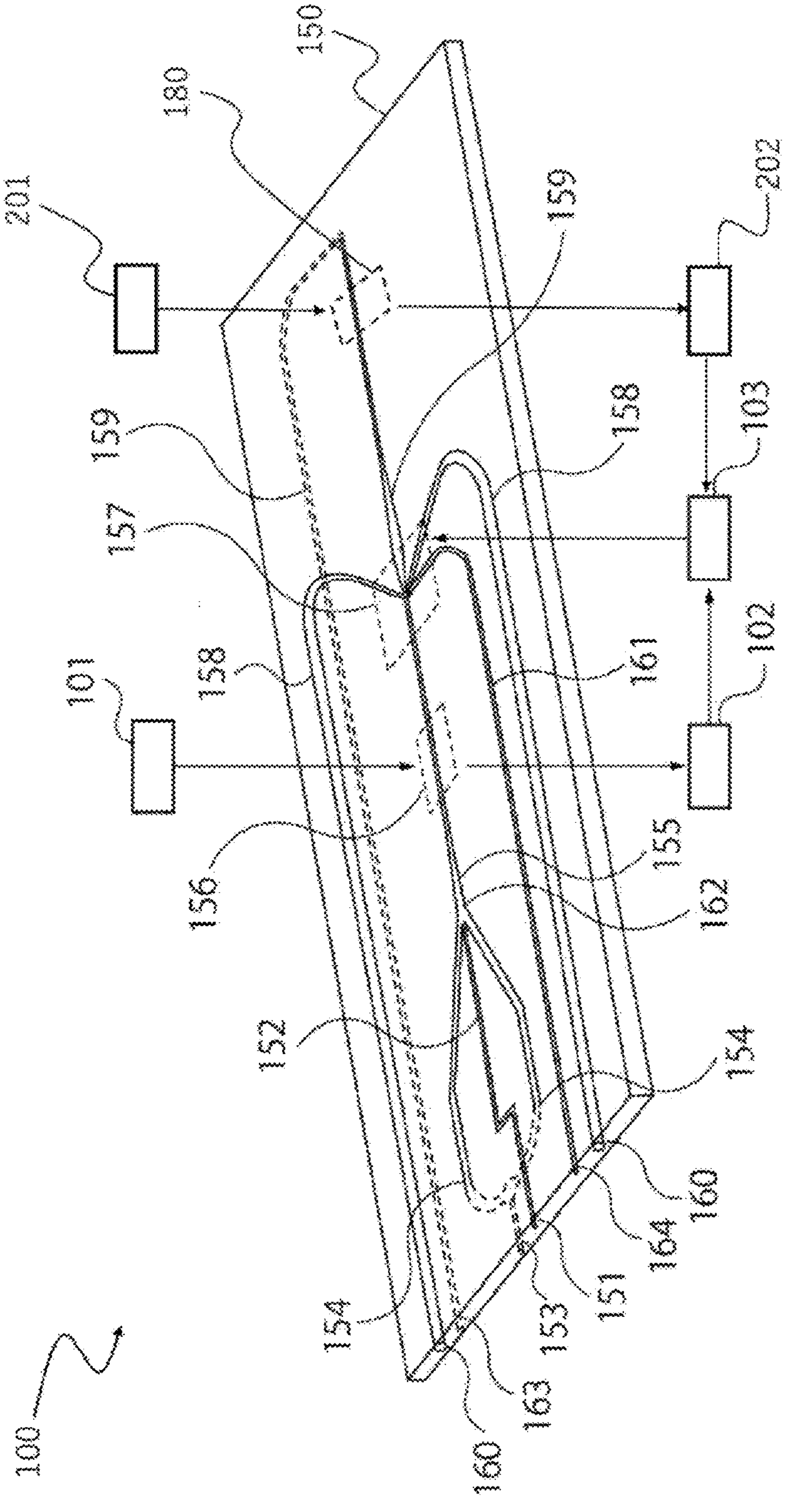
FIG. 3 is a diagram illustrating a configuration example of a biological particle sorting microchip attached to the biological sample analysis system.
Figure 4:
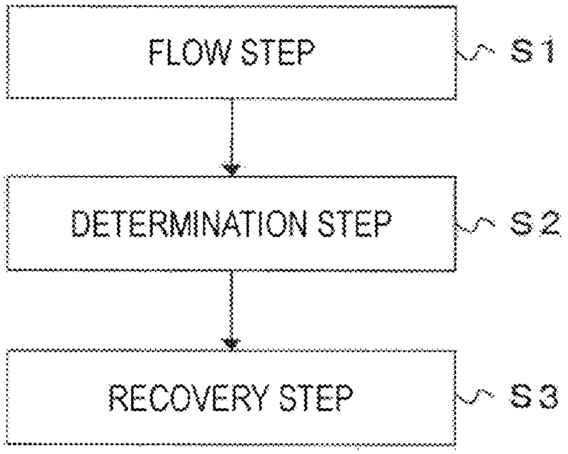
FIG. 4 is an example of a flowchart of sorting processing executed by the biological sample analysis system.

The biological sample analyzer according to the present disclosure may be designed as, for example, a device that sorts biological particles by controlling a flow channel through which the biological particles flow, and may be particularly designed as a device that sorts the biological particles in a closed space. FIG. 3 illustrates a configuration example of the biological sample analyzer. The drawing also illustrates an example of a flow channel structure of a biological particle sorting microchip (hereinafter also referred to as a "chip") attached to the device. FIG. 4 illustrates an example of a flowchart of sorting processing executed by the biological sample analyzer.

The biological sample analyzer 100 illustrated in FIG. 3 includes a first light irradiation unit 101, a first detection unit 102, and an information processing unit 103. The first light irradiation unit 101, the first detection unit 102, and the information processing unit 103 are the light irradiation unit 6101, the detection unit 6102, and the information processing unit 6103 described above, and the description is also applied to this drawing. As illustrated in FIG. 1, the information processing unit 103 can include a signal processing unit 104, a determination unit 105, and a sorting control unit 106.

Moreover, the biological sample analyzer 100 includes a second light irradiation unit 201 and a second detection unit 202, and the descriptions of the light irradiation unit 6101 and the detection unit 6102, which are described above, also apply to these. Note that specific configurations of the second light irradiation unit 201 and the second detection unit 202 may be different from those of the first light irradiation unit 101 and the first detection unit 102, respectively. The data acquired by the second light irradiation unit 201 and the second detection unit 202 may be different from the data acquired by the first light irradiation unit 101 and the first detection unit 102.

The biological sample analyzer 100 further includes a chip 150. The chip 150 may be included as a component of the sorting unit 6104 described above. The chip 150 may be attached to the biological sample analyzer 100 in an exchangeable manner.

Hereinafter, first, the biological particle sorting microchip 150 will be described, and next, the sorting operation by the biological sample analyzer 100 will be described.

The biological particle sorting microchip 150 illustrated in FIG. 3 includes a sample liquid flow channel 152 and a sheath liquid flow channel 154 that joins the sample liquid flow channel 152 at a junction 162. The biological particle sorting microchip 150 further includes a sample liquid inlet 151 and a sheath liquid inlet 153.

Note that in the drawing, a part of the sheath liquid flow channel 154 is indicated by a dotted line. The part indicated by the dotted line is located at a position lower than that of the sample liquid flow channel 152 indicated by a solid line (position displaced in an optical axis direction as indicated by an arrow extending from reference sign 101 to reference sign 102), and the flow channels do not communicate with each other at a position where the flow channel indicated by the dotted line intersects the flow channel indicated by the solid line. Furthermore, in the drawing, the sample liquid flow channel 152 is illustrated to bend twice between the sample liquid inlet 151 and the junction 162, which makes it easy to distinguish between the sample liquid flow channel 152 and the sheath liquid flow channel 154. The sample liquid flow channel 152 may be formed linearly without bending in this manner between the sample liquid inlet 151 and the junction 162.

In the biological particle sorting operation, a sample liquid containing biological particles is introduced from the sample liquid inlet 151 into the sample liquid flow channel 152, and a sheath liquid not including the biological particles is introduced from the sheath liquid inlet 153 into the sheath liquid flow channel 154.

The biological particle sorting microchip 150 includes a joined flow channel 155 including the junction 162 on one end thereof. The joined flow channel 155 includes a sorting discrimination unit 156 (hereinafter, also referred to as a "first detection region 156") used to perform sorting determination of biological particles.

In the biological particle sorting operation, the sample liquid and the sheath liquid merge at the junction 162, and then flow through the joined flow channel 155 toward a particle sorting unit 157. Especially, the sample liquid and the sheath liquid merge at the junction 162 to form, for example, a laminar flow in which the sample liquid is surrounded by the sheath liquid. Preferably, in the laminar flow, the biological particles are arrayed substantially in a line. Due to the flow channel structure in which the sample liquid flow channel 152 and two sheath liquid flow channels 154 merge at the junction 162, and the flow channel structure including the joined flow channel 155 of which one end is the junction 162, the laminar flow including the biological particles that flow substantially in a line is formed.

Figure 6:
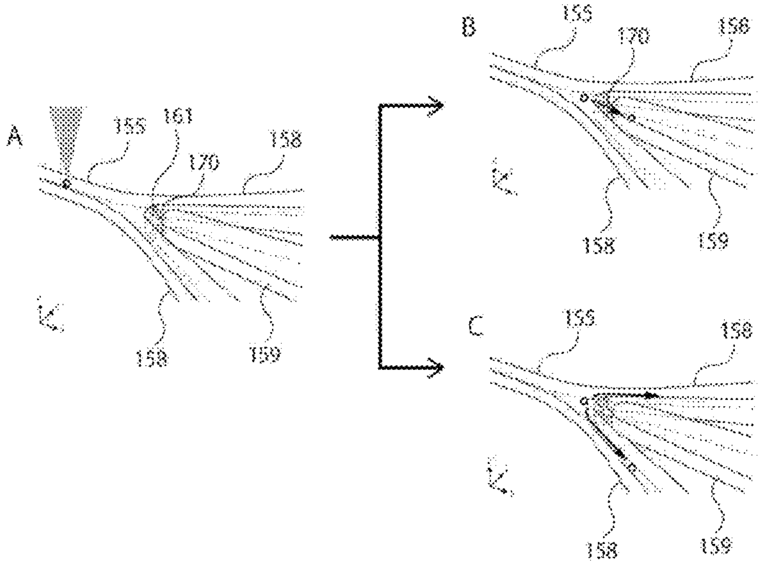
FIG. 6 is a schematic diagram of a configuration example of a particle sorting unit of the biological particle sorting microchip.

The biological particle sorting microchip 150 further includes the particle sorting unit 157 at the other end of the joined flow channel 155. FIG. 6 is an enlarged view of the particle sorting unit 157. As illustrated in A of the drawing, at the other end, the joined flow channel 155 is connected to a biological particle recovery flow channel 159 via a connection flow channel 170. As illustrated in A of the drawing, the joined flow channel 155, the connection flow channel 170, and the biological particle recovery flow channel 159 may be coaxial with each other.

In a case where a sorting target particle flows to the particle sorting unit 157, as illustrated in B of the drawing, a flow from the joined flow channel 155 through the connection flow channel 170 to enter the biological particle recovery flow channel 159 is formed, and the sorting target particle is recovered into the biological particle recovery flow channel 159. In this manner, the sorting target particle flows to the biological particle recovery flow channel 159 through the connection flow channel 170.

In a case where the biological particle that is not the sorting target particle flows into the particle sorting unit 157, the biological particle that is not the sorting target particle flows into one of two branching flow channels 158 as illustrated in C of the drawing. In this case, the flow to enter the biological particle recovery flow channel 159 is not formed. As described above, the biological particle sorting microchip 150 includes two branching flow channels 158 connected to the joined flow channel 155 at the other end of the joined flow channel 155.

As illustrated in FIG. 3, the biological particle sorting microchip 150 includes an introduction flow channel 161 for introducing the liquid into the connection flow channel 170.

By introducing the liquid from the introduction flow channel 161 into the connection flow channel 170, the connection flow channel 170 is filled with the liquid. Thus, it is possible to prevent unintended biological particles from entering the biological particle recovery flow channel 159.

Figure 7:
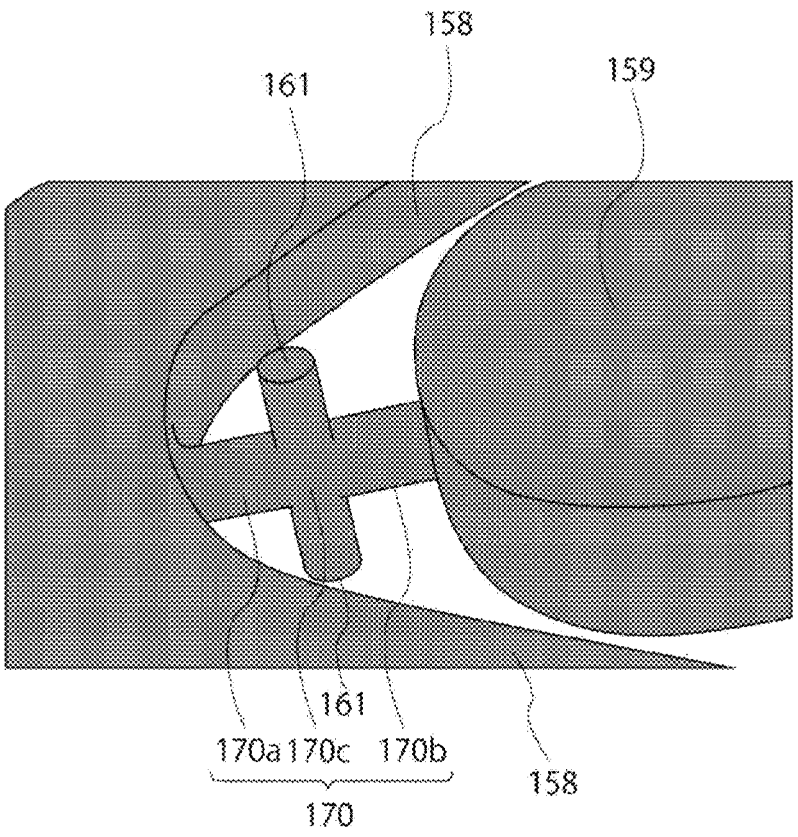
FIG. 7 is a schematic perspective view of the vicinity of a connection flow channel.
Figure 8:
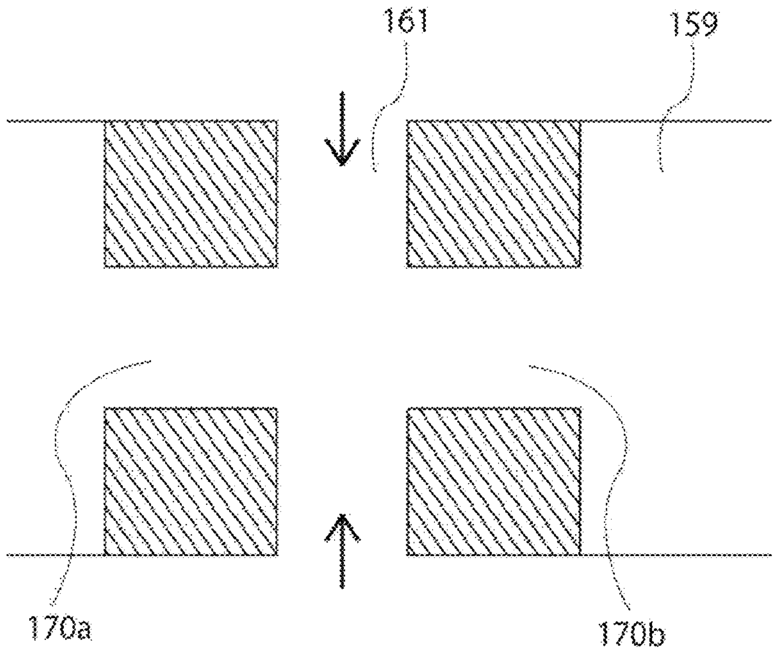
FIG. 8 is a schematic cross-sectional view of the vicinity of the connection flow channel.

The introduction flow channel 161 and the connection flow channel 170 will be described with reference to FIGS. 7 and 8. FIG. 7 is a schematic perspective view of the vicinity of the connection flow channel 170. FIG. 8 is a schematic cross-sectional view on a plane passing through a center line of the introduction flow channel 161 and a center line of the connection flow channel 170. The connection flow channel 170 includes a flow channel 170*a* on a side of the sorting discrimination unit 156 (hereinafter, also referred to as an upstream side connection flow channel 170*a*), a flow channel 170*b* on a side of the biological particle recovery flow channel 159 (hereinafter, also referred to as a downstream side connection flow channel 170*b*), and a connection 170*c* between the connection flow channel 170 and the introduction flow channel 161. The introduction flow channel 161 is provided so as to be substantially perpendicular to an axis of the flow channel of the connection flow channel 170. In FIGS. 6 and 7, the two introduction flow channels 161 are provided so as to face each other at substantially the center position of the connection flow channel 170, but the flow channel may be designed to include only one introduction flow channel.

As indicated by arrows in FIG. 8, liquid is supplied from the two introduction flow channels 161 to the connection flow channel 170. The liquid flows from the connection 170*c* to both the upstream side connection flow channel 170*a* and the downstream side connection flow channel 170*b*.

In a case where the recovery step is not performed, the liquid flows as follows.

The liquid that flows to the upstream side connection flow channel 170*a* exits from a connection surface to the joined flow channel 155 of the connection flow channel 170, and then flows separately to the two branching flow channels 158. Since the liquid exits from the connection surface in this manner, it is possible to prevent the liquid and the biological particles that do not need to be recovered into the biological particle recovery flow channel 159 from entering the biological particle recovery flow channel 159 through the connection flow channel 170. The liquid that flows to the downstream side connection flow channel 170*b* flows into the biological particle recovery flow channel 159. Therefore, the biological particle recovery flow channel 159 is filled with the liquid.

Also in a case where the recovery step is performed, the liquid may be supplied from the two introduction flow channels 161 to the connection flow channel 170. However, due to pressure fluctuation in the biological particle recovery flow channel 159, especially, by generating a negative pressure in the biological particle recovery flow channel 159, a flow from the joined flow channel 155 through the connection flow channel 170 to the biological particle recovery flow channel 159 is formed. That is, a flow is formed from the joined flow channel 155 to the biological particle recovery flow channel 159 through the upstream side connection flow channel 170*a*, the connection 170*c*, and the downstream side connection flow channel 170*b* in this order. Therefore, the sorting target particle is recovered into the biological particle recovery flow channel 159.

As illustrated in FIG. 3, the biological particle recovery flow channel 159 is formed so as to extend linearly from the particle sorting unit 157, make a U-turn, and then reach the same surface as a surface on which the sample liquid inlet 151 and the sheath liquid inlet 153 are formed. The liquid that flows through the biological particle recovery flow channel 159 is discharged out of the chip from a recovery flow channel terminal 163.

As illustrated in the drawing, the two branching flow channels 158 are also formed so as to extend linearly from the particle sorting unit 157, make a U-turn, and then reach the same surface as the surface on which the sample liquid inlet 151 and the sheath liquid inlet 153 are formed. The liquid that flows through the branching flow channel 158 is discharged out of the chip from a branching flow channel terminal 160.

In the drawing, a display method of the biological particle recovery flow channel 159 is changed from a solid line to a dotted line at the U-turn. This change indicates that the position in the optical axis direction changes on the way. By changing the position in the optical axis direction in this manner, the biological particle recovery flow channel 159 is not communicated with the branching flow channel 158 in a portion intersecting with the branching flow channel 158.

Both the recovery flow channel terminal 163 and two branching flow channel terminals 166 are formed on the surface on which the sample liquid inlet 151 and the sheath liquid inlet 153 are formed. Moreover, an introduction flow channel inlet 164 for introducing a liquid into the introduction flow channel 161 as described later is also formed on the surface. In this manner, in the biological particle sorting microchip 150, all of the inlets from which the liquid is introduced and the outlets from which the liquid is discharged are formed on one surface.

Therefore, attachment of the chip to the biological particle analyzer 100 becomes easy. For example, as compared with a case where the inlet and/or outlet are formed on two or more surfaces, connection between the flow channel provided on the biological sample analyzer 100 and the flow channel of the biological particle sorting microchip 150 becomes easy.

The biological particle recovery flow channel 159 includes a detection region 180 for detecting the recovered biological particles. The second light irradiation unit 201 irradiates the recovered biological particles with light in the detection region 180. Then, the second detection unit 202 detects light generated by the light irradiation. The second detection unit 202 transmits information regarding the detected light to the information processing unit 103. The information processing unit 103 may be designed to count, for example, the number of sorted particles on the basis of the information, and in particular, counts the number of sorted particles per unit time.

FIG. 4 is a flowchart illustrating processing performed on the biological particles. As illustrated in the drawing, the biological particle sorting operation using the biological particle sorting microchip 150 includes a flow step S1 of allowing the liquid containing the biological particles to flow through the joined flow channel 155, a determination step S2 of determining whether the biological particles that flow through the joined flow channel 155 are the sorting target particles, and a recovery step S3 of recovering the sorting target particles into the biological particle recovery flow channel 159. Each step is described below.

(3-1) Flow Step

In the flow step S1, the sample liquid containing the biological particles and the sheath liquid not containing the biological particles are introduced from the sample liquid inlet 151 and the sheath liquid inlet 153 into the sample liquid flow channel 152 and the sheath liquid flow channel 154, respectively. The sample liquid may be, for example, a biological sample containing biological particles, and particularly may be a biological sample containing biological particles such as cells.

(3-2) Determination Step

In the determination step S2, it is determined whether the biological particle that flows through the joined flow channel 155 is the sorting target particle. Specifically, the first detection unit 102 detects light generated by the light irradiation to the biological particles by the first light irradiation unit 101. The information processing unit 103 (in particular, the determination unit 105) can make the determination on the basis of the light generated by the light irradiation of the biological particle by the first light irradiation unit 101.

Furthermore, the information processing unit 103 generates data related to the number of detected particles per unit time on the basis of the detected light (particularly, on the basis of the number of times of detection of light).

The signal processing unit 104 included in the information processing unit 103 may process a waveform of the digital electrical signal obtained by the detection unit 102 to generate information (data) regarding a feature of the light used for the determination by the determination unit 105. As the information regarding the feature of the light, the signal processing unit 104 may acquire, for example, one, two, or three of a width of the waveform, a height of the waveform, and an area of the waveform from the waveform of the digital electrical signal. Furthermore, the information regarding the feature of the light may include, for example, time when the light is detected.

On the basis of the light generated by irradiating the biological particle that flows in the flow channel with light, the determination unit 105 included in the information processing unit 103 determines whether the biological particle is the sorting target particle. The determination may be performed, for example, by whether the information regarding the feature of the light meets a reference designated in advance. The reference may be a reference indicating that the biological particles are sorting target particles, and may be so-called gate information.

(3-3) Recovery Step

In the recovery step S3, the biological particle determined to be the sorting target particle at the determination step S2 is recovered into the biological particle recovery flow channel 159. The recovery step S3 is performed in the particle sorting unit 157 in the chip 150. In the particle sorting unit 157, the laminar flow that flows through the joined flow channel 155 separately flows to the two branching flow channels 158.

Figure 9:
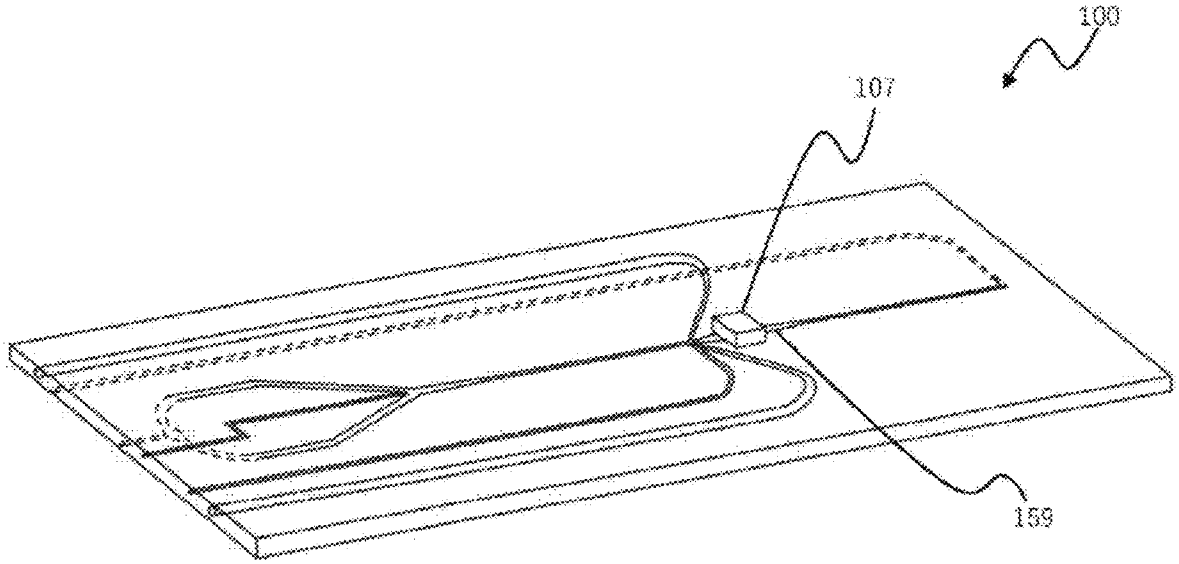
FIG. 9 is a diagram for describing a pressure change element attached to the outside of the biological particle sorting microchip.

In the recovery step S3, due to the pressure fluctuation in the biological particle recovery flow channel 159, the sorting target particle is recovered into the biological particle recovery flow channel through the connection flow channel. The recovery may be performed, for example, by generating the negative pressure in the biological particle recovery flow channel 159 as described above. For example, as illustrated in FIG. 9, the negative pressure can be generated when a wall defining the biological particle recovery flow channel 159 is deformed by a pressure change element (also referred to as an actuator) 107 attached to the outside of the microchip 150. The information processing unit 103, in particular, the sorting control unit 106 can drive the pressure change element 107 to deform the wall. The pressure change element 107 may be, for example, a piezo actuator. The negative pressure may form the flow entering the biological particle recovery flow channel 159. In this manner, the sorting target particles are sorted in the particle sorting unit 157 and recovered into the biological particle recovery flow channel 159.

(4) Setting Processing

The biological sample analysis system is designed to perform processing of setting a section that defines a time for acquiring data related to light generated by light irradiation at one or more irradiation points other than the reference irradiation point. The biological sample analysis system may execute the section setting processing on the basis of a change in data related to light accompanying a change in the section. The section setting processing may be executed by the information processing unit, for example. Hereinafter, an example of the setting processing will be described with reference to FIGS. 10 and 11. These drawings are an example of a flowchart of the setting processing.

Hereinafter, for better understanding, an example of processing of setting a data acquisition section on the time axis of the irradiation point L2 in a case where the irradiation point L1 among the plurality of irradiation points L1, L2, and L3 shown on the left side of FIG. 5 is set as a reference irradiation point will be described. Hereinafter, the section is also referred to as a "time gate". In the following setting processing, the start point of the time gate, that is, the start point GS of the section shown on the right side of FIG. 5 is set with respect to the irradiation point L2.

Similar setting processing can be performed for the irradiation point L3. In addition, the reference irradiation point need not be the irradiation point located on the most upstream side, and may be, for example, any other irradiation point. That is, the reference irradiation point may be L2 or L3 instead of L1, and the time gate start point of the irradiation point other than the reference irradiation point may be set with the reference irradiation point as L2 or L3. Moreover, the number of irradiation points is not limited to three, and may be any integer value of two or more.

Assume that the length of the time gate, that is, the length (time) between the start point GS and the end point GE of the section shown on the right side of FIG. 5 is set in advance. In addition, assume that the flow rate in the flow channel is also set in advance. The length of the time gate may be appropriately set according to, for example, detected light. Furthermore, the flow rate may be appropriately set, for example, according to the characteristics of the sample.

Figure 10:
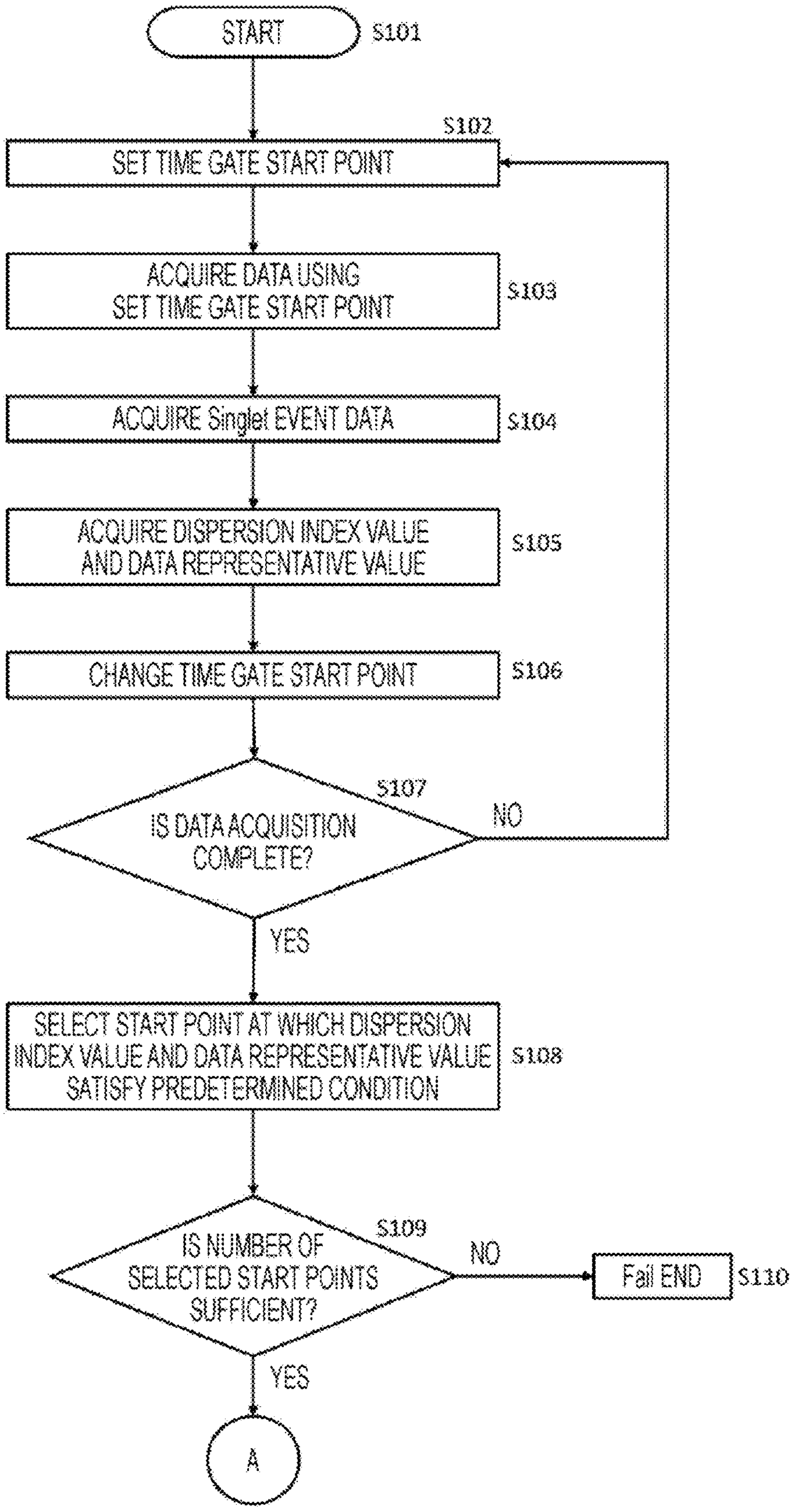
FIG. 10 is an example of a flowchart of time gate setting processing.
Figure 11:
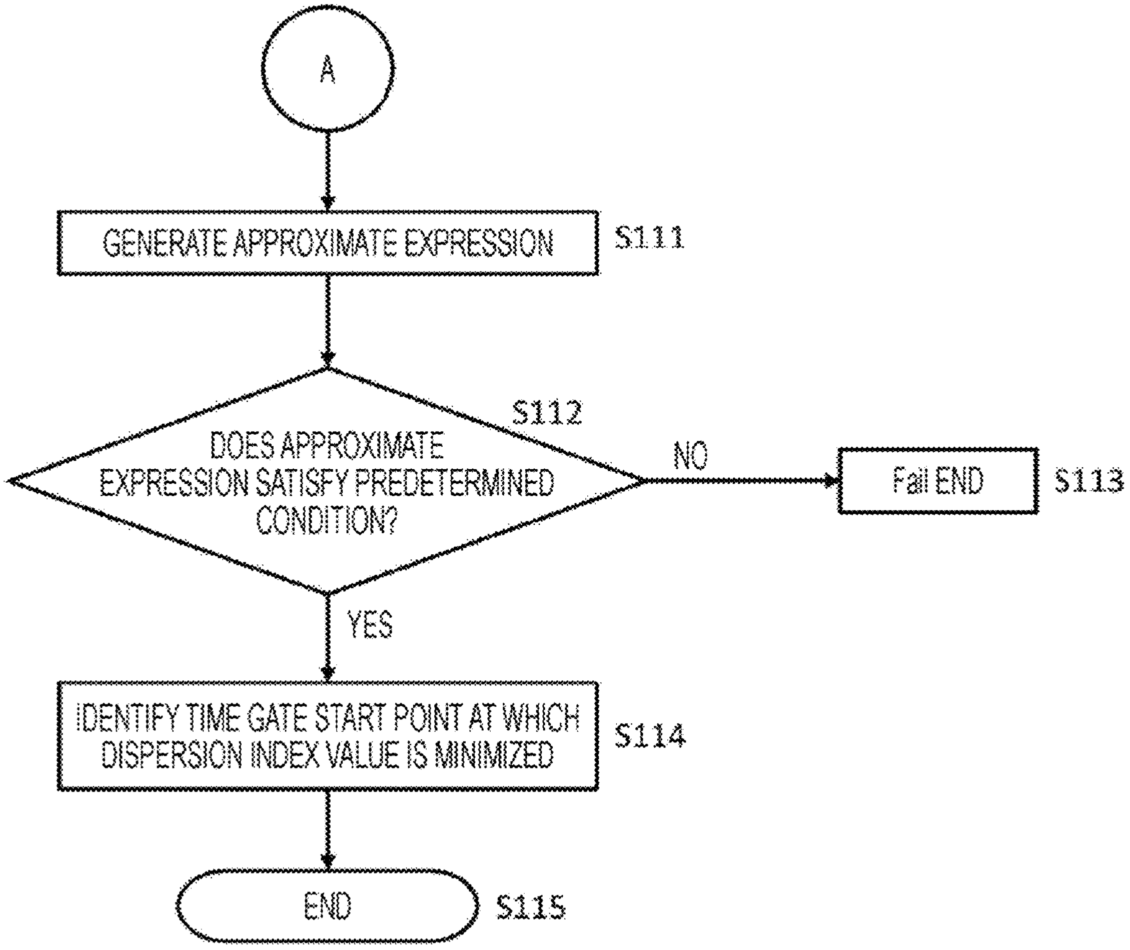
FIG. 11 is an example of a flowchart of time gate setting processing.

(Step S101) In step S101 illustrated in FIG. 10, the information processing unit starts the section setting processing. The setting processing may be performed, for example, before execution of analysis processing of a biological sample by the biological sample analysis system. The setting processing may be performed, for example, in a calibration step of the device. In the calibration step, the length of the time gate and the flow rate may be set, and the setting processing according to the present disclosure may be performed thereafter.

(Step S102: Initial Value Setting Processing)

In step S102, the information processing unit sets a time gate start point to an initial value. The initial value may be set in advance on the basis of the configuration of the device, such as the distance between the irradiation points L1 and L2. Furthermore, the initial value may be set on the basis of the flow rate of the sample in addition to the configuration of the device.

(Step S103: Data Acquisition Processing)

In step S103, the biological sample analysis system acquires event data using the time gate start point set in step S102. In order to acquire the event data, one kind of bead may be used, or a mixture of a plurality of kinds of beads is allowed to flow in the flow channel. The one kind of bead may have known fluorescence characteristics, and, for example, beads having high uniformity in size and fluorescence intensity are preferable. The mixture of a plurality of kinds of beads may also have known fluorescence characteristics, and may be formed of a plurality of kinds of beads having high uniformity in size and fluorescence intensity. As the one kind of bead and the mixture of a plurality of kinds of beads, for example, beads used as calibration beads or alignment beads in the flow cytometry field may be used.

In step S103, in the biological sample analysis system, in order to acquire event data, each particle flowing through the flow channel passes through the irradiation points L1 and L2, and light generated at the time of the passage is detected by the detection unit. Data related to light detected by the detection unit is transmitted to the information processing unit. The data related to light is used as event data.

(Step S104: Data Acquisition Processing of One Kind of Bead)

In step S104, the information processing unit acquires singlet data of one kind of bead from the event data. Scattered light data may be used to acquire the singlet data. For example, software known in the technical field may be used to acquire the singlet data, and AutoGate may be used, for example. Even in a case where a mixture of a plurality of kinds of beads is used, singlet data of one kind of bead can be acquired using this software.

As described above, in a case where a bead group including two or more kinds of calibration beads is used in the section setting processing according to the present disclosure, the biological sample analysis system may execute processing of acquiring data related to light of one kind of calibration bead of the bead group. For example, the biological sample analysis system can acquire data related to light of the one kind of calibration bead on the basis of scattered light data.

(Step S105: Acquisition Processing of Dispersion Index Value and Data Representative Value)

In step S105, the information processing unit acquires the dispersion index value and the data representative value of the singlet data acquired in step S104.

The dispersion index value is a value representing dispersion of the singlet data. The dispersion index value may be, for example, a coefficient of variation (CV), and particularly may be a robust coefficient of variation (rCV). In addition, the dispersion index value may be another value that can be referred to for representing the dispersion of the singlet data, and, for example, dispersion, standard deviation, or the like may be used.

The data representative value is a value representing a central tendency of the singlet data. The data representative value may be preferably a median value. In addition, the data representative value may be another value representing a central tendency of the singlet data, and, for example, a mean value or a mode value may be used.

In this manner, in step S105, the dispersion index value and the data representative value in a case where the time gate start point set in step S102 is adopted are acquired.

In a preferred embodiment, the dispersion index value is a coefficient of variation (particularly, a robust coefficient of variation) of area data, and the data representative value is a median value of height data. In an alternative preferred embodiment, the dispersion index value is a coefficient of variation (in particular, a robust coefficient of variation) of height data, and the data representative value is a median value of area data. In these embodiments, the time gate start point can be set particularly appropriately.

(Step S106: Section Change Processing (Time Gate Change Processing))

In step S106, the information processing unit changes the time gate start point. The change may be performed so as to sweep a predetermined range on the time axis. The predetermined range may be a range from the initial value to a predetermined value.

In a case where the initial value is adopted in step S102, the time gate start point can be changed in step S106 so as to be farther from the detection time point at the reference irradiation point or to be closer to the detection time point at the reference irradiation point by a predetermined time from the initial value.

(Step S107: Data Acquisition Completion Determination Processing)

In step S107, the information processing unit determines whether the processing in step S105 has been executed for all points within a predetermined range on the time axis.

For this determination, for example, it may be determined whether the changed time gate start point exceeds a predetermined maximum value.

In a case where the changed time gate start point exceeds the predetermined maximum value, the information processing unit advances the processing to step S108. This is because in this case, the processing in step S105 is executed for all the time points within the predetermined range.

In a case where the changed time gate start point does not exceed the predetermined maximum value, the information processing unit returns the processing to step S102. Then, the information processing unit adopts the changed time gate start point and executes steps S102 to S107 as described above.

As described above, by repeating steps S102 to S107, the dispersion index value and the data representative value are acquired for each of all points within the predetermined range on the time axis. That is, data including each point within the predetermined range on the time axis where the time gate start point can be set and the dispersion index value and the data representative value in a case where the time gate start point is set at each point is obtained.

That is, according to the present disclosure, the change in the time gate (the section) may be a change in which the time gate (in particular, the time gate start point) is delayed stepwise from a time point at which each of the particles passes through the reference irradiation point, or a change in which the time gate (in particular, the time gate start point) is brought closer stepwise to a time point at which each of the particles passes through the reference irradiation point. In this way, the time gate (in particular, the time gate start point) is changed so as to sweep a predetermined range on the time axis.

Then, the information processing unit may acquire data related to light for each of the changed time gates (the sections). As a result, data for generating an approximate expression to be described later is collected.

In a case where a plurality of fluorescence channels is allocated to detect light generated at the irradiation point L2, the dispersion index value and the data representative value may be acquired for each of all points within a predetermined range on the time axis for each of the plurality of fluorescence channels.

(Step S108: Data Selection Processing)

In step S108, the information processing unit selects a time gate start point at which the dispersion index value and the data representative value satisfy a predetermined condition. The predetermined condition is set such that data suitable for generating an approximate expression to be described later is selected. For example, the predetermined condition may be that the dispersion index value is less than a predetermined first threshold value (or equal to or less than a predetermined first threshold value), and that the data representative value is more than a predetermined second threshold value (or equal to or greater than a predetermined second threshold value). In this manner, by combining the condition related to the dispersion index value and the condition related to the data representative value, it is possible to select appropriate data for generating an approximate expression to be described later.

In a case where the dispersion index value is large, there is a high possibility that the set time gate is not appropriate. When the time gate greatly deviates from the detected pulse waveform, the dispersion index value increases. Therefore, when the predetermined condition includes a condition that the dispersion index value is less than (or equal to or less than) the predetermined first threshold value, data inappropriate for generating the approximate expression is excluded.

Here, the predetermined first threshold value may be set in advance according to the type of the dispersion index value. For example, in a case where the dispersion index value is a robust coefficient of variation (rCV), the predetermined first threshold value may be, for example, any value between 5% and 30%, and may be, for example, any value between 15% and 30%. For example, a condition that the dispersion index value is 25% or less can be included in the predetermined condition.

For example, as the variation in the timing at which the particle passes through the laser beam irradiation point increases and the pulse waveform largely protrudes from the time gate, the rCV of the fluorescence data increases. The dispersion index value at the time gate start point where the value of rCV is too large is not appropriate for generating an approximate expression to be described later. Therefore, by selecting the time gate start point according to the condition using the first threshold value, data that is not appropriate for generating an approximate expression can be excluded.

Furthermore, when the pulse waveform greatly deviates even more from the time gate, the rCV may be decreased. In such a case, there is a high possibility that the time gate cannot properly acquire the light data. Therefore, as described below, by selecting the time gate start point according to the condition using the second threshold value related to the data representative value, data that is not appropriate for generating the approximate expression can be excluded.

In a case where the data representative value is small, there is a high possibility that the set time gate is not appropriate. When the time gate greatly deviates from the detected pulse waveform, the fluorescence intensity of the detected event decreases. Therefore, when the predetermined condition includes a condition that the data representative value exceeds the predetermined second threshold value (or is equal to or greater than the predetermined second threshold value), data inappropriate for generating the approximate expression is excluded.

Here, the information processing unit can set the second threshold value on the basis of the acquired data representative value. The data representative value may vary depending on the kind of beads used or the measurement conditions. Therefore, an appropriate second threshold value can be set by setting it on the basis of the acquired data representative value.

In one embodiment, the information processing unit may identify the maximum value from a data representative value group obtained by repeating steps S102 to S107, for example, and may adopt a value obtained by multiplying the maximum value by a predetermined percentage value as the second threshold value. The information processing unit can set, for example, a value of 80% to 99% of the maximum value, particularly a value of 85% to 95% of the maximum value, more particularly a value of 90% of the maximum value, as the second threshold value. Such a second threshold value is useful for selecting data for appropriately generating an approximate expression to be described later.

The first threshold value may be set in advance, while the second threshold value may be changed according to the bead to be used. Therefore, in a preferred embodiment of the present disclosure, step S108 includes a second threshold value setting step of setting a second threshold value, and a selection step of selecting a time gate start point at which the dispersion index value and the data representative value satisfy a predetermined condition. Then, here, the predetermined condition may be that the dispersion index value is less than a preset first threshold value, and that the data representative value is greater than the preset second threshold value.

In this embodiment, since the second threshold value according to the characteristic of the bead is set, appropriate data selection can be performed according to the bead used by the user.

As described above, according to the present disclosure, the information processing unit can execute selection processing of selecting data used to create the approximate expression. The information processing unit may execute the selection processing on the basis of, for example, a data representative value of area data or height data of the detected light and/or a dispersion index value of height data or area data of the detected light.

Then, the information processing unit can generate an approximate expression to be described later using data in which the data representative value of the area data or the height data of the detected light satisfies a predetermined first condition and the dispersion index value of the height data or the area data of the detected light satisfies a predetermined second condition.

Example of Processing in Step S108

An example of the processing in step S108 will be described with reference to FIGS. 12A and 12B. These drawings are diagrams illustrating a result of plotting an area data robust coefficient of variation (Area rCV) and a height data median value (Height Median) of light detected by each of two fluorescence channels (CH4 and CH5) assigned as detectors that detect light generated by light irradiation at the irradiation point L2 with respect to a time gate start point (LDT).

Figure 12A:
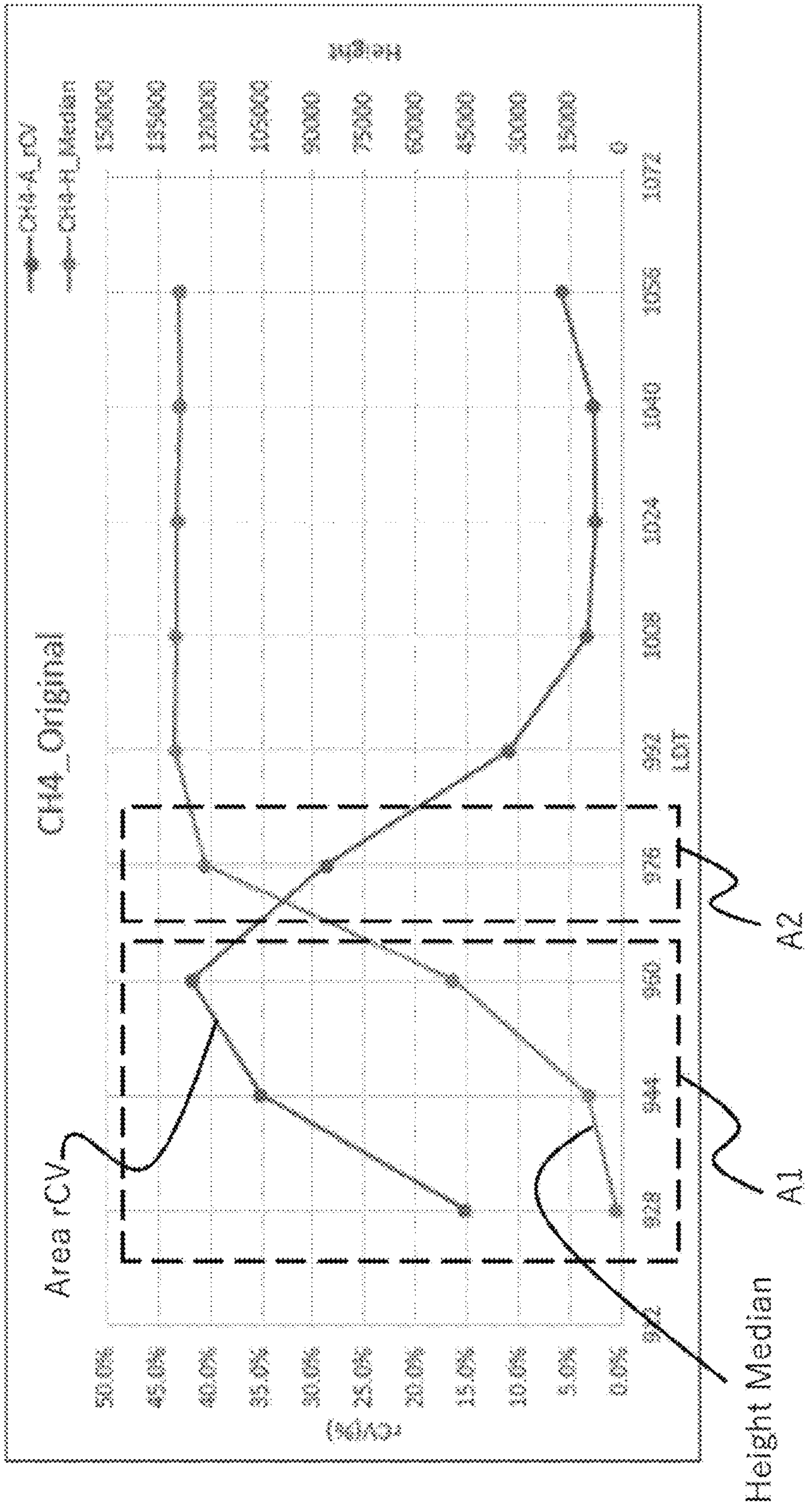
FIG. 12A is a diagram for describing an example of processing of selecting a time gate start point at which a dispersion index value and a data representative value satisfy a predetermined condition.

In FIG. 12A, the horizontal axis (LDT) is a time axis, and corresponds to a time gate start point where a position where each measurement point is plotted is set. The numerical value on the horizontal axis is a value indicating the degree of delay of the time gate start point of the irradiation point L2 with respect to the light irradiation at the reference irradiation point L1. The unit of the numerical value is an arbitrarily set value, and for example, the numerical value 1024 on the horizontal axis indicates that the time gate start point of the irradiation point L2 is delayed by 20 μs from the light irradiation time point at the reference irradiation point L1.

By repeating steps S102 to S107 as described above, the area data robust coefficient of variation and the height data median value were measured for each of all points within the predetermined range on the time axis. In FIG. 12A, the area data robust coefficient of variation and the height data median value in a case where the time gate start point is set to 928, 944, 960, 976, 992, 1008, 1024, 1040, and 1056 on the time axis are measured, and these values are plotted with respect to the time axis.

In step S108, the information processing unit selects a time gate start point at which the dispersion index value (area data robust coefficient of variation) and the data representative value (height data median value) satisfy a predetermined condition on the basis of the measurement data. The predetermined condition is a condition that the area data robust coefficient of variation is less than a predetermined first threshold value and the data representative value is greater than a predetermined second threshold value.

Assume that the predetermined first threshold value is preset and is 25%. On the other hand, the predetermined second threshold value changes according to factors such as a measurement environment and a measurement target. Therefore, the information processing unit acquires the predetermined second threshold value in step S108. The information processing unit identifies the maximum value among the height data median values obtained by repeating steps S102 to S107. As a result, the second threshold value can be identified.

When the predetermined first threshold value is 25% and the predetermined second threshold value is 90% of the maximum value of the height data median value, the predetermined condition is a condition that the area data robust coefficient of variation is less than 25% and the height data median value is greater than 90% of the maximum value. The information processing unit identifies a time gate start point at which the area data robust coefficient of variation and the height data median value satisfying the predetermined condition are measured.

Regarding the fluorescence channel CH4 shown in FIG. 12A, at the time gate start point in the dotted line A1, the height data median value is less than 90% of the maximum value (LDT: 928, 944, and 960). In addition, at the time gate start point in the dotted line A1, the area data robust coefficient of variation may also be 25% or more (LDT: 944 and 960). At the time gate start point in the dotted line A2, the height data median value is 90% or more of the maximum value, but the area data robust coefficient of variation is 25% or more (LDT: 976). Therefore, since the time gate start points in the dotted line A1 and the dotted line A2 do not satisfy the predetermined condition, the information processing unit does not select these time gate start points.

Since the predetermined condition is satisfied for the other time gate start points (LDT: 992 to 1056), the information processing unit selects these time gate start points.

Figure 12B:
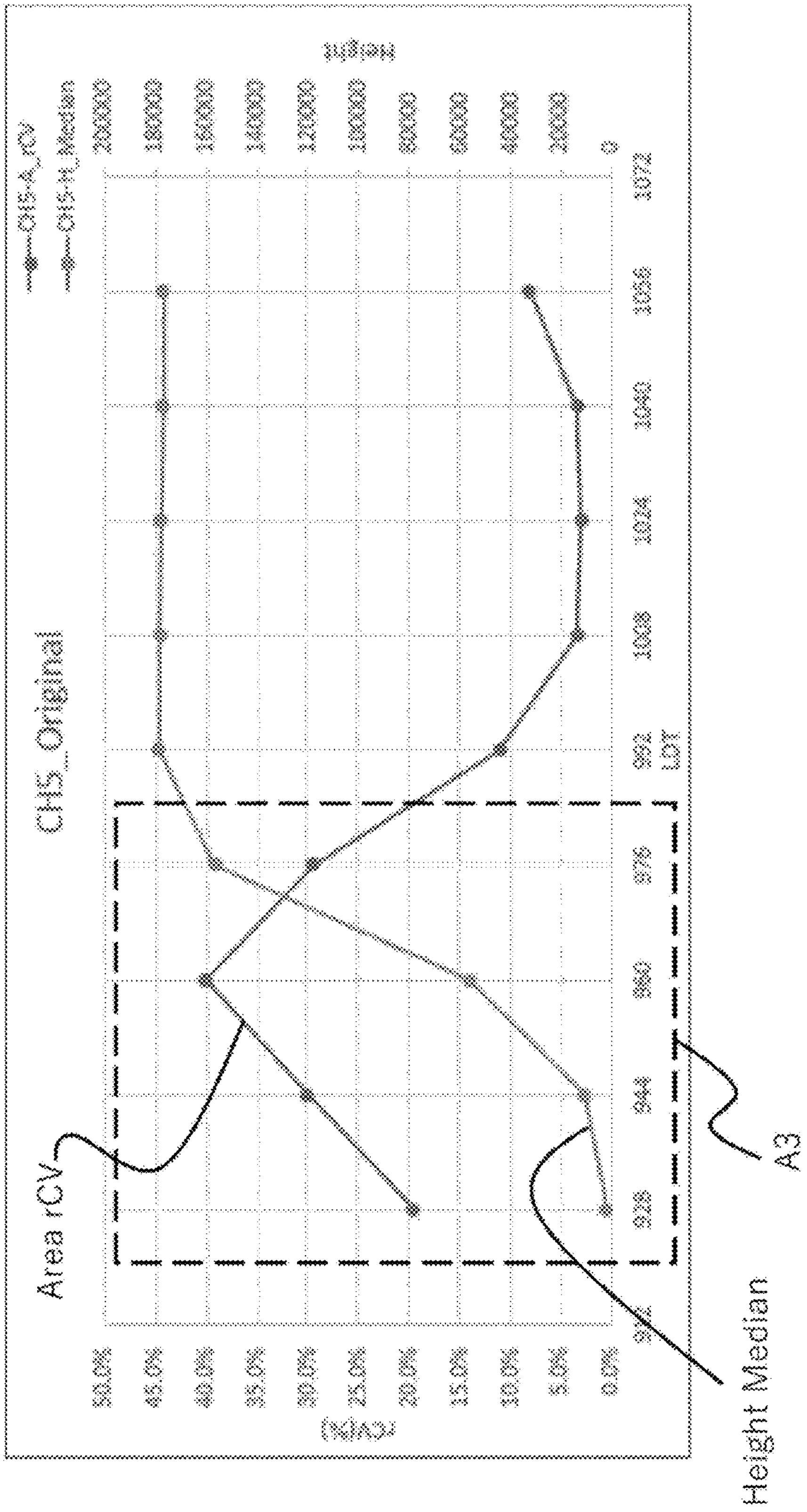
FIG. 12B is a diagram for describing an example of processing of selecting a time gate start point at which a dispersion index value and a data representative value satisfy a predetermined condition.

Similarly, regarding the fluorescence channel CH5 illustrated in FIG. 12B, at the time gate start point in the dotted line A3, the height data median value is less than 90% of the maximum value, or the area data robust coefficient of variation is 25% or more (LDT: 928 to 976). Therefore, since the time gate start points in the dotted line A3 do not satisfy the predetermined condition, the information processing unit does not select these time gate start points.

Since the predetermined condition is satisfied for the other time gate start points (LDT: 992 to 1056), the information processing unit selects these time gate start points.

As described above, in step S108, the information processing unit selects the time gate start point satisfying the predetermined condition for each fluorescence channel on the basis of the measurement result by each fluorescence channel.

(Step S109: Data Number Determination Processing)

In step S109, the information processing unit determines whether the number of time gate start points selected in step S108 is sufficient for generating an approximate expression in step S111.

In a case where the approximate expression is a quadratic approximation, at least three pieces of data are required. Therefore, in this case, the information processing unit determines whether the number of time gate start points selected in step S108 is three or more.

In a case where the information processing unit determines that the number of selected time gate start points is sufficient for generating an approximate expression, the information processing unit advances the processing to step S111.

In a case where the information processing unit determines that the number of selected time gate start points is not sufficient for generating an approximate expression, the information processing unit advances the processing to step S110.

Example of Processing in Step S109

With respect to the measurement results of FIGS. 12A and 12B described above, in step S108, the information processing unit selects a time gate start point (LDT: 992 to 1056) for each of the fluorescence channels CH4 and CH5. The number of selected time gate start points is five for any fluorescence channel.

In a case where the approximate expression generated in step S111 is a quadratic approximation, at least three pieces of data are required. In this case, the information processing unit determines in step S109 whether the number of selected time gate start points is three or more.

As described above, since the number of time gate start points selected in step S108 is five for any fluorescence channel, the information processing unit determines that the number of selected time gate start points is three or more, and advances the processing to step S111.

(Step S110: End Processing)

In step S110, the information processing unit may end the time gate setting processing. Then, when the time gate setting processing ends, data (for example, alert display or error display) indicating failure of the time gate setting can be output. As a result, for example, it is possible to prompt the user to redo the calibration or to confirm the status of the system.

(Step S111: Approximate Expression Generation Processing)

In step S111, the information processing unit generates an approximate expression on the basis of the time gate start point selected in step S108 and the dispersion index value at each time gate start point. The approximate expression may be, for example, a quadratic approximation. The approximate expression represents a change in the dispersion index value according to the position of the time gate start point. Therefore, the position of the data start point having the smallest dispersion can be identified by the approximate expression.

In a case where a plurality of fluorescence channels is allocated to detect light generated at the irradiation point L2, the approximate expression may be generated for each of the plurality of fluorescence channels. That is, in the present disclosure, the detection unit may include two or more photodetectors that detect light generated by light irradiation at one irradiation point, and the information processing unit may be designed to create the approximate expression for each of the two or more photodetectors.

As described above, according to the present disclosure, the information processing unit may generate an approximate expression representing a change in data related to light accompanying a change in the section, using a data set including each time gate (section, particularly a start point of the section) and data (particularly a dispersion index value) related to light corresponding to each time gate (section, particularly a start point of the section). Then, the information processing unit may set the section on the basis of an approximate expression representing a change in the dispersion index value. An example of processing using the approximate expression will be described below.

Example of Processing in Step S111

Figure 13A:
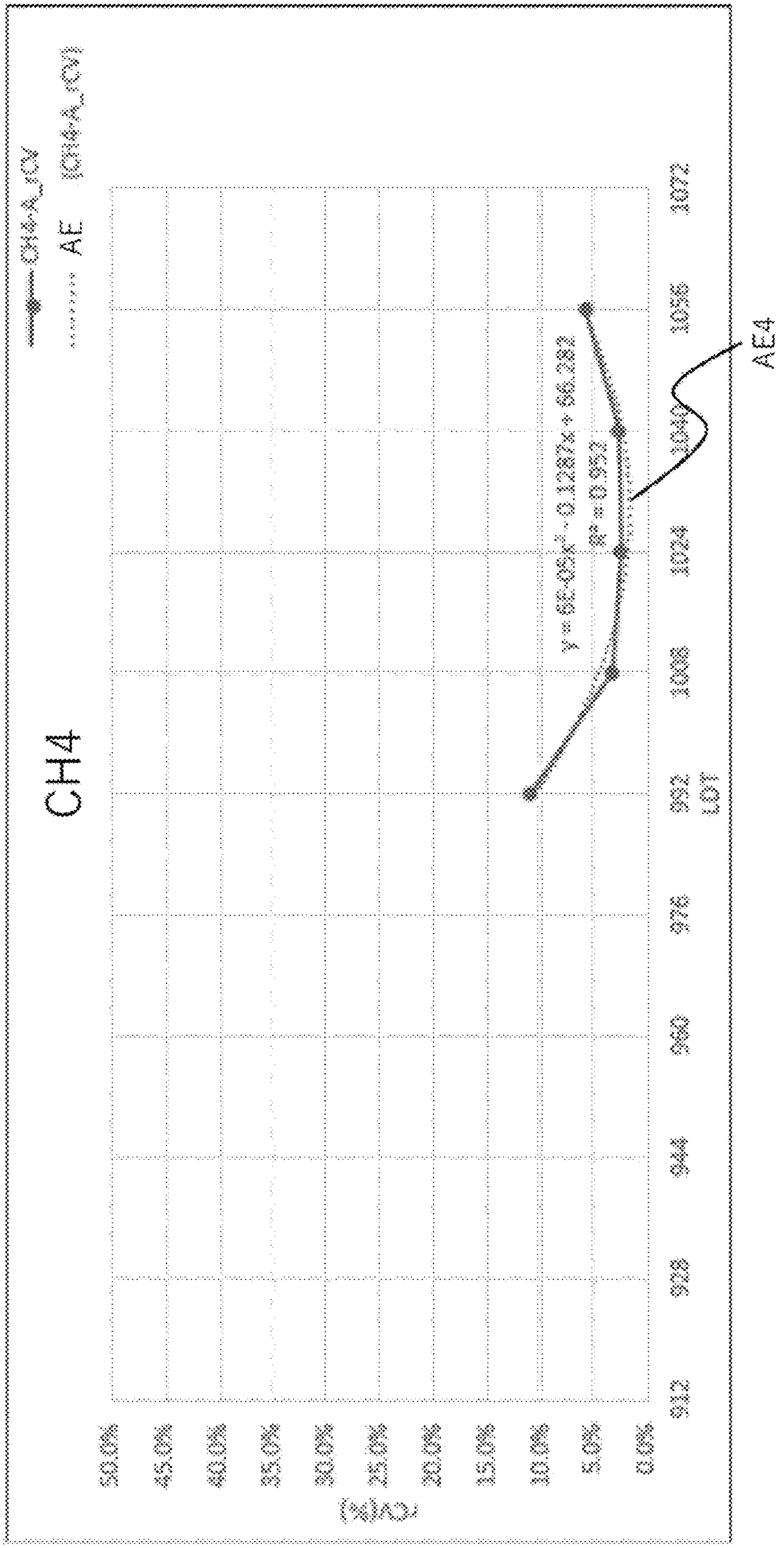
FIG. 13A is a diagram for describing an example of approximate expression generation processing based on a selected time gate start point.
Figure 13B:
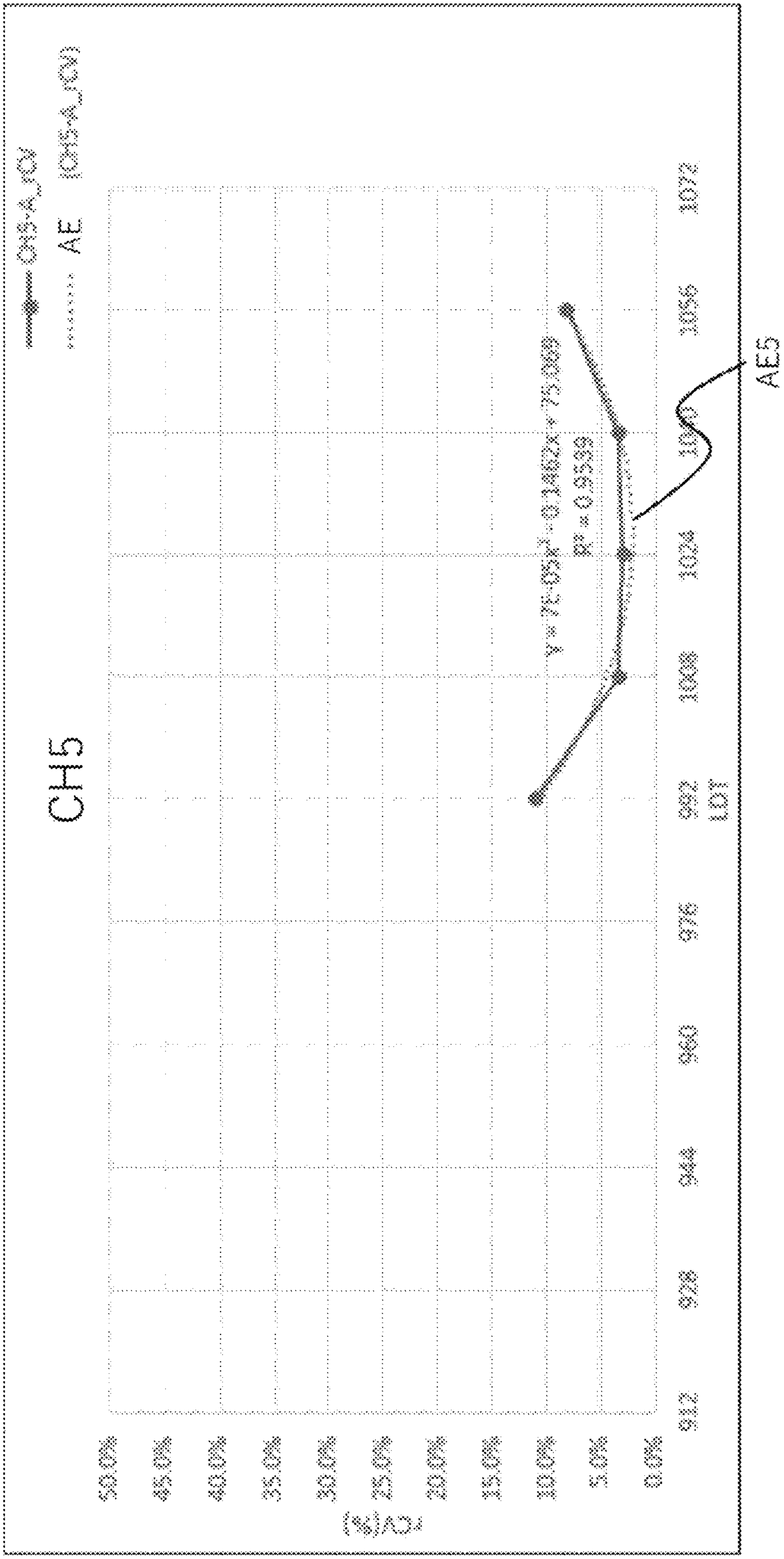
FIG. 13B is a diagram for describing an example of approximate expression generation processing based on a selected time gate start point.

As described with reference to FIGS. 12A and 12B, in step S108, five time gate start points are selected for each of the fluorescence channels CH4 and CH5. In step S111, the information processing unit generates a quadratic approximation for each fluorescence channel on the basis of the selected five time gate start points and the area data robust coefficient of variation at each time gate start point. The information processing unit acquires a determination coefficient $R^2$ of each of the secondary approximate expressions in accordance with the generation of the quadratic approximation. The curves drawn by the generated quadratic approximation are shown in FIGS. 13A and 13B. AE4 and AE5 indicated by dotted lines in these drawings are the quadratic approximation.

FIGS. 13A and 13B correspond to the fluorescence channels CH4 and CH5, respectively, and also illustrate measurement results at five time gate start points selected in FIGS. 12A and 12B.

As illustrated in FIGS. 13A and 13B, the following quadratic approximation was obtained for the fluorescence channels CH4 and CH5 on the basis of the area data robust coefficient of variation at five time gate start points. The determination coefficient $R^2$ of the quadratic approximation was also acquired as follows.

$$\text{Quadratic approximation of } CH4\text{: } y=6\times10^{-5}\times x^2-0.1287\times x+66.282, R^2\text{:}0.952$$

$$\text{Quadratic approximation of } CH5\text{: } y=7\times10^{-5}\times x^2-0.1462\times x+75.069, R^2\text{:}0.9539$$

(Step S112: Approximate Expression Determination Processing)

In step S112, the information processing unit determines whether the approximate expression generated in step S111 satisfies a predetermined condition regarding goodness of fit. The predetermined condition may be, for example, that a determination coefficient of the approximate expression is a predetermined threshold value or more. For example, the predetermined condition may be that the determination coefficient is, for example, 0.700 or more, particularly 0.750 or more, more particularly 0.800 or more, and still more particularly 0.850 or more. By executing such processing, it is possible to determine whether the approximate expression is appropriate for setting the data start point.

In a case where the information processing unit determines that the approximate expression satisfies the predetermined condition, the information processing unit advances the process to step S114.

In a case where the information processing unit determines that the approximate expression does not satisfy the predetermined condition, the information processing unit advances the processing to step S113.

In a case where a plurality of fluorescence channels is allocated in order to detect light generated at the irradiation point L2, the information processing unit may determine whether all of the approximate expressions generated for each of the plurality of fluorescence channels satisfy the predetermined condition.

In a case where the information processing unit determines that all of the approximate expressions satisfy the predetermined condition, the information processing unit advances the processing to step S114.

In a case where the information processing unit determines that any one of the approximate expressions does not satisfy the predetermined condition, the information processing unit advances the processing to step S113.

Example of Processing in Step S112

As described with reference to FIGS. 13A and 13B, in step S111, the quadratic approximation and the determination coefficient are obtained for each of the fluorescence channels CH4 and CH5. In step S112, the information processing unit determines whether each quadratic approximation satisfies a predetermined condition regarding goodness of fit. The predetermined condition is that a determination coefficient of the quadratic approximation is a predetermined threshold value or more. In a case where 0.800 is adopted as the predetermined threshold value, in step S112, the information processing unit determines whether the determination coefficient of each of the quadratic approximations is 0.800 or more.

As described above, the determination coefficient $R^2$ of the quadratic approximation of CH4 is 0.952. Therefore, the information processing unit determines that the quadratic approximation of CH4 satisfies the predetermined condition.

Similarly, the determination coefficient $R^2$ of the quadratic approximation of CH5 is 0.9539. Therefore, the information processing unit determines that the quadratic approximation of CH5 satisfies the predetermined condition.

In this way, in a case where it is determined that all the determination coefficients of the quadratic approximations satisfy the predetermined condition, the information processing unit advances the processing to step S114.

(Step S113: End Processing)

In step S113, the information processing unit may end the time gate setting processing. Then, when the time gate setting processing ends, data (for example, alert display or error display) indicating failure of the time gate setting can be output. As a result, for example, it is possible to prompt the user to redo the calibration or to confirm the status of the system.

(Step S114: Time Gate Start Point Setting Processing)

In step S114, the information processing unit identifies a time gate start point at which the dispersion index value is minimized using the approximate expression generated in step S112. The information processing unit sets the identified time gate start point as a start point of a section for acquiring data related to light generated by laser light irradiation at the irradiation point L2.

In a case where a plurality of fluorescence channels is allocated in order to detect light generated at the irradiation point L2, the information processing unit identifies a time gate start point at which the dispersion index value is minimized using the approximate expression generated for each of the plurality of fluorescence channels.

Here, in a case where there is one time gate start point that can be set for one irradiation point, the information processing unit may calculate a mean value of the time gate start points having the minimum dispersion index value identified as described above. Then, the information processing unit may set the mean value as a time gate start point of the irradiation point.

At the time of the setting, the information processing unit may determine whether the mean value is within a predetermined numerical range (for example, within a numerical range in which a time gate start point can be set). In addition, the information processing unit may determine whether the difference between the time gate start points having the minimum dispersion index value identified as described above is within a predetermined numerical range. These numerical ranges may be appropriately set according to, for example, the configuration of the system or optical factors.

In a case where a plurality of time gate start points can be set for one irradiation point, the time gate start point having the minimum dispersion index value identified for each fluorescence channel may be set as the time gate start point of each fluorescence channel.

As described above, the information processing unit may set the time gate (the section, particularly a start point of the section) for each of the two or more photodetectors included in the detection unit on the basis of the approximate expression created for each of the photodetectors, or may set the time gate (the section, particularly a start point of the section) commonly applied to the two or more photodetectors on the basis of the approximate expression created for each of the two or more photodetectors.

Example of Processing in Step S114

As described with reference to FIGS. 13A and 13B, in step S111, the quadratic approximation is obtained for each of the fluorescence channels CH4 and CH5. In step S114, the information processing unit identifies a time gate start point at which the area data robust coefficient of variation is minimized using these quadratic approximations.

For the identification, for example, each value from the minimum value to the maximum value among the five time gate start points selected in step S108 may be substituted into each quadratic approximation. The minimum value is 992 and is 1056. Therefore, the information processing unit substitutes each integer value from 992 to 1056 into the quadratic approximation, and identifies a time gate start point at which the area data robust coefficient of variation is minimized. As a result, for the fluorescence channel CH4, the time gate start point at which the area data robust coefficient of variation is minimum is identified to be 1029. For the fluorescence channel CH5, the time gate start point at which the area data robust coefficient of variation is minimum is identified to be 1027.

In a case where there is only one time gate start point that can be set for the irradiation point L2, the information processing unit calculates a mean value of the two identified time gate start points. The mean value is (1029+1027)/2=1028. The information processing unit determines whether the mean value is within a predetermined numerical range (time gate settable numerical range). The numerical range is assumed to be 924 to 1124. In this case, it is determined that the mean value is within the numerical range. Furthermore, the difference between the identified two time gate start points is calculated. The difference is two. The processing unit determines whether the difference is within a predetermined numerical range. The predetermined numerical range is assumed to be 20 or less. In this case, it is determined that the difference is within the numerical range. The information processing unit sets the mean value as a time gate start point of the irradiation point L2 in response to determination that each of the mean value and the difference is within a predetermined numerical range.

(Step S115: End Processing)

In step S115, the information processing unit ends the setting processing. Furthermore, the information processing unit sets a time gate start point for the irradiation point L3 similarly to L2. In this manner, a start point of a section for acquiring data related to light generated by light irradiation at the irradiation points L2 and L3 other than the reference irradiation point L1 is set.

After the end of the setting processing, the biological sample analysis system may execute the analysis processing of the biological sample as described in (2) and (3) above using the set section.

2. Second Embodiment (Method for Setting Light Data Acquisition Section in Biological Sample Analysis System)

The present disclosure also provides a method for setting an acquisition section adopted by a biological sample analysis system in analysis. The biological sample analysis system may be a biological sample analysis system including: a light irradiation unit designed to irradiate each particle flowing through a flow channel with light at a plurality of irradiation points; a detection unit that detects light generated when each particle passes through each of the plurality of irradiation points; and an information processing unit that processes data related to light detected by the detection unit. The configuration of the biological sample analysis system may be as described in 1. above.

The setting method includes executing processing of setting a section that defines a time for acquiring data related to light generated by light irradiation at one or more irradiation points other than the reference irradiation point. The processing may be executed as described in "(4) Setting Processing" in 1. above. For example, the section setting processing may be executed on the basis of a change in data related to light accompanying a change in the section.

The present disclosure also provides a program for causing the biological sample analysis system (in particular, a biological sample analyzer or an information processing device) to execute the setting method. The program may be stored in, for example, an information processing unit included in a biological sample analysis system. Furthermore, the program may be stored in an information recording medium or may be designed to be available online. The information recording medium may be, for example, an optical recording medium such as a DVD or a CD, or may be a magnetic recording medium or a flash memory.

3. Third Embodiment (Information Processing Device)

The present disclosure also relates to an information processing device. For example, the information processing device may be designed to process data related to light detected by a detection unit in a biological sample analysis system including: a light irradiation unit designed to irradiate each particle flowing through a flow channel with light at a plurality of irradiation points; and the detection unit designed to detect light generated when each particle passes through each of the plurality of irradiation points. The information processing device may have, for example, the configuration related to the information processing unit described in 1. above, and the description of the information processing unit is also applicable to the present embodiment.

The information processing device may be designed to execute processing of setting a section that defines a time for acquiring data related to light generated by light irradiation at an irradiation point different from a reference irradiation point on the basis of a change in data related to light accompanying a change in the section. The information processing device can execute the section setting processing as described in "(4) Setting Processing" in 1. described above.

Note that the present disclosure can also have the following configurations.

[1]

A biological sample analysis system including:

- a light irradiation unit designed to irradiate each particle flowing through a flow channel with light at a plurality of irradiation points;
- a detection unit that detects light generated when each of the particles passes through each of the plurality of irradiation points; and
- an information processing unit that processes data related to light detected by the detection unit, in which
- the information processing unit is designed to perform processing of setting a section that defines a time for acquiring data related to light generated by light irradiation at an irradiation point different from a reference irradiation point, and
- the information processing unit executes the section setting processing on the basis of a change in data related to light accompanying a change in the section.

[2]

The biological sample analysis system according to [1], in which the information processing unit executes the section setting processing on the basis of an approximate expression representing a change in data related to light accompanying a change in the section.

[3]

The biological sample analysis system according to [1] or [2], in which the change in data related to light is a change in a dispersion index value regarding area data or height data of detected light.

[4]

The biological sample analysis system according to [3], in which the information processing unit sets the section on the basis of an approximate expression representing the change in a dispersion index value.

[5]

The biological sample analysis system according to any one of [1] to [4], in which the change in the section is a change in which the section is delayed stepwise from a time point at which each of the particles passes through the reference irradiation point, or a change in which the section is brought closer stepwise to a time point at which each of the particles passes through the reference irradiation point.

[6]

The biological sample analysis system according to [5], in which the information processing unit acquires data related to light for each of the changed sections.

[7]

The biological sample analysis system according to [6], in which the information processing unit uses a data set including each section and data related to light corresponding to each section to generate an approximate expression representing a change in data related to light accompanying a change in the section.

[8]

The biological sample analysis system according to [7], in which the information processing unit selects data used to create the approximate expression on the basis of a data representative value of area data or height data of detected light and/or a dispersion index value of height data or area data of detected light.

[9]

The biological sample analysis system according to [8], in which the information processing unit generates the approximate expression using data in which a data representative value of area data or height data of detected light satisfies a predetermined first condition and a dispersion index value of height data or area data of detected light satisfies a predetermined second condition.

[10]

The biological sample analysis system according to [2], in which the detection unit includes two or more photodetectors that detect light generated by light irradiation at one irradiation point, and the information processing unit is designed to create the approximate expression for each of the two or more photodetectors.

[11]

The biological sample analysis system according to [10], in which the information processing unit sets the section for each of the two or more photodetectors on the basis of the approximate expression created for each of the photodetectors, or sets the section commonly applied to the two or more photodetectors on the basis of the approximate expression created for each of the two or more photodetectors.

[12]

The biological sample analysis system according to any one of [1] to [11], in which in a case where a bead group including two or more kinds of calibration beads is used in the section setting processing, the biological sample analysis system executes processing of acquiring data related to light of one kind of calibration bead of the bead group.

[13]

The biological sample analysis system according to [12], in which the biological sample analysis system acquires data related to light of the one kind of calibration bead on the basis of scattered light data.

[14]

The biological sample analysis system according to any one of [1] to [13], in which the biological sample analysis system is designed to sort biological particles.

[15]

The biological sample analysis system according to [14], in which the particle sorting is performed in a closed space.

[16]

A method for setting a light data acquisition section in a biological sample analysis system including: a light irradiation unit designed to irradiate each particle flowing through a flow channel with light at a plurality of irradiation points; a detection unit that detects light generated when each of the particles passes through each of the plurality of irradiation points; and an information processing unit that processes data related to light detected by the detection unit, the method including performing processing of setting a section that defines a time for acquiring data related to light generated by light irradiation at one or more irradiation points different from a reference irradiation point, in which the section setting processing is performed on the basis of a change in data related to light accompanying a change in the section.

[17]

An information processing device in which data related to light detected by a detection unit of a biological sample analysis system including a light irradiation unit designed to irradiate each particle flowing through a flow channel with light at a plurality of irradiation points, and the detection unit that detects light generated when each of the particles passes through each of the plurality of irradiation points is processed, and processing of setting a section that defines a time for acquiring data related to light generated by light irradiation at an irradiation point different from a reference irradiation point is executed on the basis of a change in data related to light accompanying a change in the section.

REFERENCE SIGNS LIST

100 Biological sample analysis system (biological sample analyzer)

101 First light irradiation unit

102 First detection unit

103 Information processing unit

201 Second light irradiation unit

202 Second detection unit

The invention claimed is:

1. A biological sample analysis system comprising:

a light irradiation unit designed to irradiate each particle flowing through a flow channel with light at a plurality of irradiation points;

a detection unit that detects light generated when each of the particles passes through each of the plurality of irradiation points; and an information processing unit that processes data related to light detected by the detection unit, wherein the information processing unit is designed to perform processing of setting a section that defines a time for acquiring data related to light generated by light irradiation at an irradiation point different from a reference irradiation point, and the information processing unit executes the section setting processing on a basis of a change in data related to light accompanying a change in the section.

2. The biological sample analysis system according to claim 1, wherein the information processing unit executes the section setting processing on a basis of an approximate expression representing a change in data related to light accompanying a change in the section.

3. The biological sample analysis system according to claim 1, wherein the change in data related to light is a change in a dispersion index value regarding area data or height data of detected light.

4. The biological sample analysis system according to claim 3, wherein the information processing unit sets the section on a basis of an approximate expression representing the change in a dispersion index value.

5. The biological sample analysis system according to claim 1, wherein the change in the section is a change in which the section is delayed stepwise from a time point at which each of the particles passes through the reference irradiation point, or a change in which the section is brought closer stepwise to a time point at which each of the particles passes through the reference irradiation point.

6. The biological sample analysis system according to claim 5, wherein the information processing unit acquires data related to light for each of the changed sections.

7. The biological sample analysis system according to claim 6, wherein the information processing unit uses a data set including each section and data related to light corresponding to each section to generate an approximate expression representing a change in data related to light accompanying a change in the section.

8. The biological sample analysis system according to claim 7, wherein the information processing unit selects data used to create the approximate expression on a basis of a data representative value of area data or height data of detected light and/or a dispersion index value of height data or area data of detected light.

9. The biological sample analysis system according to claim 8, wherein the information processing unit generates the approximate expression using data in which a data representative value of area data or height data of detected light satisfies a predetermined first condition and a dispersion index value of height data or area data of detected light satisfies a predetermined second condition.

10. The biological sample analysis system according to claim 2, wherein the detection unit includes two or more photodetectors that detect light generated by light irradiation at one irradiation point, and the information processing unit is designed to create the approximate expression for each of the two or more photodetectors.

11. The biological sample analysis system according to claim 10, wherein the information processing unit sets the section for each of the two or more photodetectors on a basis of the approximate expression created for each of the photodetectors, or sets the section commonly applied to the two or more photodetectors on a basis of the approximate expression created for each of the two or more photodetectors.

12. The biological sample analysis system according to claim 1, wherein in a case where a bead group including two or more kinds of calibration beads is used in the section setting processing, the biological sample analysis system executes processing of acquiring data related to light of one kind of calibration bead of the bead group.

13. The biological sample analysis system according to claim 12, wherein the biological sample analysis system acquires data related to light of the one kind of calibration bead on a basis of scattered light data.

14. The biological sample analysis system according to claim 1, wherein the biological sample analysis system is designed to sort biological particles.

15. The biological sample analysis system according to claim 14, wherein the particle sorting is performed in a closed space.

16. A method for setting a light data acquisition section in a biological sample analysis system including: a light irradiation unit designed to irradiate each particle flowing through a flow channel with light at a plurality of irradiation points; a detection unit that detects light generated when each of the particles passes through each of the plurality of irradiation points; and an information processing unit that processes data related to light detected by the detection unit, the method comprising executing processing of setting a section that defines a time for acquiring data related to light generated by light irradiation at an irradiation points different from a reference irradiation point, wherein the section setting processing is executed on a basis of a change in data related to light accompanying a change in the section.

17. An information processing device wherein data related to light detected by a detection unit of a biological sample analysis system including a light irradiation unit designed to irradiate each particle flowing through a flow channel with light at a plurality of irradiation points, and the detection unit that detects light generated when each of the particles passes through each of the plurality of irradiation points is processed, and processing of setting a section that defines a time for acquiring data related to light generated by light irradiation at an irradiation point different from a reference irradiation point is executed on a basis of a change in data related to light accompanying a change in the section.

* * * * *